US012492280B2

(12) United States Patent
Salzinger et al.

(10) Patent No.: US 12,492,280 B2
(45) Date of Patent: Dec. 9, 2025

(54) PROCESS FOR PRODUCING A POLYURETHANE COMPOSITION

(71) Applicant: BASF SE, Ludwigshafen am Rhein (DE)

(72) Inventors: Stephan Salzinger, Heerenveen (NL); Robert Reichardt, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 790 days.

(21) Appl. No.: 17/297,276

(22) PCT Filed: Nov. 27, 2019

(86) PCT No.: PCT/EP2019/082695
§ 371 (c)(1),
(2) Date: May 26, 2021

(87) PCT Pub. No.: WO2020/109366
PCT Pub. Date: Jun. 4, 2020

(65) Prior Publication Data
US 2021/0380750 A1    Dec. 9, 2021

(30) Foreign Application Priority Data
Nov. 28, 2018 (EP) .................... 18208978

(51) Int. Cl.
*C08G 18/08* (2006.01)
*C08G 18/20* (2006.01)
*C08G 18/22* (2006.01)
*C08G 18/28* (2006.01)
*C08G 18/48* (2006.01)
*C08G 18/75* (2006.01)
*C08K 5/16* (2006.01)
*C08L 75/08* (2006.01)
*C09D 7/40* (2018.01)
*C09D 7/63* (2018.01)
*C09D 175/04* (2006.01)

(52) U.S. Cl.
CPC ..... *C08G 18/0895* (2013.01); *C08G 18/2063* (2013.01); *C08G 18/227* (2013.01); *C08G 18/2825* (2013.01); *C08G 18/283* (2013.01); *C08G 18/2835* (2013.01); *C08G 18/4833* (2013.01); *C08G 18/755* (2013.01); *C08G 18/758* (2013.01); *C08K 5/16* (2013.01); *C08L 75/08* (2013.01); *C09D 175/04* (2013.01); *C09D 7/40* (2018.01); *C09D 7/63* (2018.01)

(58) Field of Classification Search
CPC ............ C08G 18/0895; C08G 18/2063; C08G 18/227; C08G 18/2825; C08G 18/283; C08G 18/4833; C08G 18/755; C08G 18/758; C08G 18/2835; C08K 5/16; C08L 75/08; C09D 175/04; C09D 7/63; C09D 7/40
See application file for complete search history.

(56) References Cited

U.S. PATENT DOCUMENTS

| 3,286,992 | A | 11/1966 | Armeniades et al. | |
| 3,664,638 | A | 5/1972 | Grout et al. | |
| 4,201,482 | A | 5/1980 | Brauner et al. | |
| 4,692,030 | A | 9/1987 | Tauscher et al. | |
| 5,620,252 | A | 4/1997 | Maurer | |
| 2004/0110918 | A1* | 6/2004 | Laas ................... | C08G 18/798 528/73 |
| 2008/0281013 | A1* | 11/2008 | Nakamura ......... | C08G 18/4829 521/170 |
| 2009/0209659 | A1* | 8/2009 | Di Cosmo ............... | A61K 8/87 514/772.3 |
| 2010/0202248 | A1 | 8/2010 | Hirschberg et al. | |
| 2011/0080801 | A1 | 4/2011 | Georg et al. | |
| 2016/0333253 | A1* | 11/2016 | Logan .................. | B01F 25/314 |

FOREIGN PATENT DOCUMENTS

| EP | 0761780 | A2 | 3/1997 | |
| EP | 1067352 | A1 | 1/2001 | |
| EP | 1876195 | A2 * | 1/2008 | ............ B01F 13/103 |
| EP | 2596860 | A1 * | 5/2013 | ............ B01F 5/061 |
| EP | 3023446 | A1 * | 5/2016 | ............ A61K 8/87 |
| WO | WO-0133586 | A1 * | 5/2001 | ............ H01F 1/0027 |

OTHER PUBLICATIONS

Machine English translation of EP 2596860, Georg et al., May 29, 2013.*
Elvers et al., "Ullmann's Encyclopedia of Industrial Chemistry—Nucleic Acids to Parasympatholytics", Arpe, 5th Edition, vol. A18, Dec. 1, 1991, pp. 368-426.
European Search Report for EP Patent Application No. 18208978.9, Issued on Jul. 9, 2019, 03 pages.
International Preliminary Report on Patentability received for PCT Patent Application No. PCT/EP2019/082695, mailed on Jun. 10, 2021, 9 pages.
International Search Report and Written Opinion received for PCT Patent Application No. PCT/EP2019/082695, mailed on Feb. 20, 2020, 10 pages.

* cited by examiner

*Primary Examiner* — Patrick D Niland
(74) *Attorney, Agent, or Firm* — Faegre Drinker Biddle & Reath LLP

(57) ABSTRACT

The presently claimed invention provides a continuous process for preparing a polyurethane composition which behaves as a rheology modifier upon addition to paint and coating formulations. The present process employs mixers for homogenization of highly viscous polyurethane polymers and by adjusting the process parameters and reactor conditions in specified ranges obtained a polyurethane composition. The polyurethane composition obtained from the process of the present invention is used as thickener in water-borne paint and coating formulations.

19 Claims, No Drawings

US 12,492,280 B2

PROCESS FOR PRODUCING A POLYURETHANE COMPOSITION

CROSS-REFERENCE TO RELATED APPLICATIONS

This application is a national stage application (under 35 U.S.C. § 371) of PCT/EP2019/082695, filed Nov. 27, 2019, which claims benefit of European Application No. 18208978.9, filed Nov. 28, 2018 both of which are incorporated herein by reference in their entirety.

FIELD OF THE INVENTION

The presently claimed invention provides a continuous process for preparing a polyurethane composition which behaves as a rheology modifier and offers a non-Newtonian rheology profile upon addition to paint and coating formulations. The polyurethane composition obtained from the process of the present invention is used as a thickener in water-borne paint and coating formulations.

BACKGROUND OF THE INVENTION

Present-day surface coating systems are increasingly made water-based in order to reduce the emission of volatile organic components (VOC). However, the pigments, binders and other constituents dispersed in the surface coating compositions are not completely water-soluble and should not settle during storage and transport, but instead should remain stably dispersed in the system. To increase the resistance to settling of the individual constituents, a higher viscosity is required. However, during production or use, a fluid, i.e. a readily processable surface coating composition, is required, the viscosity of which should be as low as possible. To resolve this contradiction, the shear rates during the individual step are critical. Low shear rates are required during the storage. The surface coating constituents are accelerated only by gravity and have only a low descent velocity, so that there is only a small velocity gradient between the pigment and the solvent. Whereas, during the use of the surface coating composition or dispersion during production, high shear rates are applied. Depending on the application, the rheology modifiers ensure that the viscosity is not constant at different shear rates, but changes as a function of the prevailing shear rate. When the viscosity decreases with increasing shear rate, a non-Newtonian fluid is present.

The use of polyurethane compositions in paint and coating formulations as rheology modifier additives, for example thickeners, is well known. Such additives are added to paint and coating formulations at low dosages to adjust and control the rheological properties of a coating or paint formulation.

It is the general state of the art that polyurethane thickeners are conventionally produced in stirred tank vessels in batch processes. The batch processes of the prior art are not much suitable to handle high or very high viscosity polyurethane-melts. A significant fraction of polyurethane polymer class shows very high bulk viscosities and is therefore produced by a solution process in an organic solvent, i.e. the final polyurethane composition is in a diluted aqueous solution. Hence, a solvent exchange is necessary. Particularly for the solvent based process, high cycle times and low space time yield result in high production costs. Also, in batch processes, several products suffer from batch-to-batch variations which require additional blending production steps.

Homogenization of the reaction components and polyurethane-melts in the prior art has been achieved by the addition of solvents and/or by mixing. In general, faster mixing on the macro-level can be achieved with a higher input of mechanical energy. The power introduced is dissipated and leads to heating. At a high power, a turbulent flow profile is produced. In a turbulent flow, chaotic eddies are formed. As a result, thin layers having a large exchange area are firstly formed by rotation of different concentration elements and, secondly, "train lines" of the flow, which in the case of laminar flow run only parallel, cross one another due to the randomly distributed mixing. Mixing transverse to the flow direction is significantly higher due to this convective contribution than in the case of laminar flow in which transverse mixing is based on diffusion alone. However, this higher flow velocity is associated with higher shear rates. These are not desirable in all applications. Thus, during stirring of a polymer melt there can be only a few millimetres between the rotating stirrer and the static polymer melt, which leads to high shear rates and directly to mechanical destruction or indirectly to thermal destruction of the polymer melt.

Based on the apparatuses used for mixing, a distinction is made between dynamic and static mixers. In the dynamic mixers, kinetic energy is introduced by moving complex mixing devices, for example a stirrer, in addition to the kinetic energy of the material being mixed. For example, EP 3 023 446 A1 provides a continuous process for the preparation of polyurethane using dynamic mixers. Dynamic mixers require costly movable parts and have high maintenance cost.

Due to the drawbacks of batch processes and limitations of mixers being used for homogenization of reaction components and highly viscous polyurethane polymers, there is an ongoing requirement for a continuous process to obtain a polyurethane composition, which provides for homogenization of highly viscous polyurethane polymers, such that the resultant polyurethane composition offers a non-Newtonian rheology profile upon addition to paint and coating formulations.

It was an object of the present invention to provide a continuous preparation process for a polyurethane composition which provides homogenization of highly viscous polyurethane polymers without the use of toxic and expensive solvents and overcomes the problems associated with the batch processes of the prior art. The polyurethane composition obtained from the process of the present invention is used as a thickener and offers a non-Newtonian rheology profile upon addition to water-borne paint and coating formulations.

SUMMARY OF THE INVENTION

Surprisingly, the inventors of the present invention found that preparing a polyurethane composition, mixing a reaction feed stream comprising polyethylene glycol (PEG), at least one compound selected from the group consisting of $C_4$ to $C_{30}$ alcohols, $C_4$ to $C_{30}$ alcohol alkoxylates and $C_4$ to $C_{30}$ alkyl phenol alkoxylates polyisocyanate and a catalyst in at least one reactor at a temperature in the range of $\geq 80°$ C. to $\leq 150°$ C. and a residence time in the range of $\geq 0.05$ h to $\leq 4$ h ensures the homogenization of a highly viscous polyurethane polymer without the use of additional solvents. The polyurethane composition obtained from the process of the presently claimed invention exhibits good thickening efficiency which enables it to be employed for a wide range of applications in coating formulations such as, but not limited to, paint, lacquer, varnish, paper coating, wood coating, adhesive, cosmetic formulation, detergent formulation, textile, and ceramic leather.

The present invention is illustrated in more detail by the following embodiments and combinations of embodiments which result from the corresponding dependency references and links:

1. A continuous process for preparing a polyurethane composition comprising the steps of:
   (A) mixing
      (a) at least one polyalkylene glycol having a water content in the range of ≥0.0 to ≤0.1 wt.-% by weight of the polyalkylene glycol,
      (b) at least one compound selected from the group consisting of $C_4$ to $C_{30}$ alcohols, $C_4$ to $C_{30}$ alcohol alkoxylates and $C_4$ to $C_{30}$ alkyl phenol alkoxylates,
      (c) at least one polyisocyanate, and
      (d) at least one catalyst,
      at a temperature in the range of ≥50° C. to ≤80° C. to obtain a reaction feed stream,
   (B) subjecting the reaction feed stream of step (A) in at least one reactor to a temperature in the range of ≥80° C. to ≤150° C. and a residence time in the range of ≥0.05 h to ≤4 h to obtain a polyurethane, and
   (C) adding water to the polyurethane of step (B) to obtain a polyurethane composition,
   characterized in that the difference between the temperature in step (B) and the temperature in step (A) is at least 10° C.

2. The process according to embodiment 1, characterized in that the difference between the temperature in step (B) and the temperature in step (A) is between 10° C. to 50° C.

3. The process according to embodiment 1 or 2, characterized in that the viscosity of the polyurethane obtained in step (B) is in the range of ≥1 Pa·s to ≤5000 Pa·s.

4. The process according to one or more of embodiments 1 to 3, characterized in that the viscosity of the polyurethane composition obtained in step (C) is in the range of ≥0.5 Pa·s to ≤100 Pa·s determined according to DIN EN ISO 3219 at a temperature of 23±0.2° C. and a shear rate of 1 $s^{-1}$.

5. The process according to embodiment 1, characterized in that the at least one polyalkylene glycol (a) has a water content in the range of ≥0 wt.-% to ≤0.05 wt.-%.

6. The process according to one or more of embodiments 1 to 5, characterized in that the at least one polyalkylene glycol (a) has a water content in the range of 0 wt.-% 0.025 wt.-%.

7. The process according to one or more of embodiments 1 to 6, characterized in that the at least one polyalkylene glycol (a) has a weight average molecular weight $M_w$ in the range of ≥2,000 g/mol to ≤100,000 g/mol determined according to DIN 55672-1.

8. The process according to embodiment 7, characterized in that the at least one polyalkylene glycol (a) has a weight average molecular weight $M_w$ in the range of ≥4,000 g/mol to ≤50,000 g/mol determined according to DIN 55672-1.10.

9. The process according to embodiment 7 or 8, characterized in that the at least one polyalkylene glycol (a) has a weight average molecular weight $M_w$ in the range of ≥4,000 g/mol to ≤25,000 g/mol determined according to DIN 55672-1.

10. The process according to one or more of embodiments 7 to 9, characterized in that the at least one polyalkylene glycol (a) has a weight average molecular weight $M_w$ in the range of ≥6,000 g/mol to ≤10,000 g/mol determined according to DIN 55672-1.

11. The process according to one or more of embodiments 7 to 10, characterized in that the at least one polyalkylene glycol (a) is a polyethylene glycol having a weight average molecular weight $M_w$ in the range of ≥7,500 g/mol to ≤9,500 g/mol determined according to DIN 55672-1.

12. The process according to one or more of embodiments 1 to 11, characterized in that the at least one compound (b) is selected from $C_4$ to $C_{30}$ aliphatic alcohols.

13. The process according to embodiment 12, characterized in that the at least one compound (b) is selected from $C_6$ to $C_{14}$ aliphatic alcohols.

14. The process according to embodiment 12, characterized that the at least one $C_4$ to $C_{30}$ aliphatic alcohol is selected from the group consisting of n-butanol, n-pentanol, n-hexanol, n-heptanol, n-octanol, n-nonanol, n-decanol, n-undecanol, n-dodecanol, n-tridecanol, n-tetradecanol, n-pentadecanol, n-hexadecanol, n-heptadecanol, n-octadecanol, n-nonadecanol, n-eicosanol, n-heneicosanol, n-docosanol, n-tricosanol, n-tetracosanol, n-pentacosanol, n-hexacosanol, n-heptacosanol, n-octacosanol, n-nonacosanol, n-triacontanol, iso-butanol, iso-pentanol, iso-hexanol, iso-heptanol, iso-octanol, iso-nonanol, iso-decanol, iso-undecanol, iso-dodecanol, iso-tridecanol, iso-tetradecanol, iso-pentadecanol, iso-hexadecanol, iso-heptadecanol, iso-octadecanol, iso-nonadecanol, iso-eicosanol, iso-heneicosanol, iso-docosanol, iso-tricosanol, iso-tetracosanol, iso-pentacosanol, iso-hexacosanol, iso-heptacosanol, iso-octacosanol, iso-nonacosanol, iso-triacontanol, 2-methyl-1-pentanol, 2-ethyl-1-hexanol, 2-propyl-1-heptanol, 2-butyl-1-octanol, 2-pentyl-1-nonanol, 2-hexyl-1-decanol, 2-heptyl-1-undecanol, 2-octyl-1-dodecanol, 2-nonyl-1-tridecanol, 2-decyl-1-tetradecanol, 2-undecyl-1-pentadecanol, 2-dodecyl-1-hexadecanol and 2-tridecyl-1-heptadecanol.

15. The process according to embodiment 13, characterized that the at least one $C_6$ to $C_{14}$ aliphatic alcohol is selected from the group consisting of n-hexanol, n-heptanol, n-octanol, n-nonanol, n-decanol, n-undecanol, n-dodecanol, n-tridecanol, n-tetradecanol, iso-hexanol, iso-heptanol, iso-octanol, iso-nonanol, iso-decanol, iso-undecanol, iso-dodecanol, iso-tridecanol, iso-tetradecanol, 2-methyl-1-pentanol, 2-ethyl-1-hexanol, 2-propyl-1-heptanol, 2-butyl-1-octanol and 2-pentyl-1-nonanol.

16. The process according to embodiment 1, characterized in that the $C_4$ to $C_{30}$ alcohol alkoxylate is a compound of the general formula II, $$R_1-(O-CH_2-CH_2)_qO-CH(CH_3)-CH_2)_r-OH \qquad (1)$$

wherein,
R1 is a substituted or unsubstituted, linear or branched, alkyl or alkenyl having 4 to 30 carbon atoms;
q is an integer in the range of ≥1 to ≤50; and
r is 0 or an integer in the range of ≥1 to ≤30, with the proviso that 2≤q+r≤80.

17. The process according to embodiment 1, characterized in that the $C_4$ to $C_{30}$ alkyl phenol alkoxylate is a compound of the general formula II,

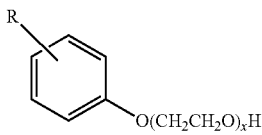

(II)

wherein,
R is a substituted or unsubstituted, linear or branched, alkyl or alkenyl having 4 to 30 carbon atoms, and
x is an integer in the range of $\geq 1$ to $\leq 15$.

18. The process according one or more of embodiments 1 to 17, characterized in that the at least one polyisocyanate (c) is selected from the group consisting of aliphatic polyisocyanate (c1) and aromatic polyisocyanate (c2).

19. The process according to embodiment 18, characterized in that the aliphatic polyisocyanate (c1) is selected from the group consisting of tetramethylene 1,4-diisocyanate, pentamethylene 1,5-diisocyanate, hexamethylene 1,6-diisocyanate, decamethylene diisocyanate, 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate, cyclobutane-1,3-diisocyanate, 1,2-, 1,3- and 1,4-cyclohexane diisocyanates, 2,4- and 2,6-methylcyclohexane diisocyanate, 4,4'- and 2,4'-dicyclohexyldiisocyanates, 1,3,5-cyclohexane triisocyanates, isocyanatomethylcyclohexane isocyanates, isocyanatoethylcyclohexane isocyanates, bis (isocyanatomethyl)-cyclohexane diisocyanates, 4,4'-diisocyanatodicyclohexylmethane, hexamethylene 1,6-diisocyanate, pentamethylene 1,5-diisocyanate, isophorone diisocyanate, and mixtures thereof.

20. The process according to embodiment 18, characterized in that the aliphatic polyisocyanate (c1) is 4,4'-diisocyanatodicyclohexylmethane and/or isophorone diisocyanate.

21. The process according to embodiment 18, characterized in that the aromatic polyisocyanate (c2) is selected from the group consisting 2,4- and 2,6-hexahydrotoluenediisocyanate, 1,2-, 1,3-, and 1,4-phenylene diisocyanates, triphenyl methane-4,4',4''-triisocyanate, naphthylene-1,5-diisocyanate, 2,4- and 2,6-toluene diisocyanate, 2,4'-, 4,4'- and 2,2-biphenyl diisocyanates, 2,2'-, 2,4'- and 4,4'-diphenylmethane diisocyanate, polyphenyl polymethylene polyisocyanates, 1,2-, 1,3- and 1,4-xylylene diisocyanates and m-tetramethylxylylene diisocyanate (TMXDI), and mixtures thereof.

22. The process according to one or more of embodiments 1 to 21, characterized in that the at least one catalyst (d) is selected from the group consisting of metallic catalyst (d1) and non-metallic catalyst (d2).

23. The process according to embodiment 22, characterized in that the metallic catalyst (d1) is selected from the group consisting of metal carbonate, metal borate, metal carboxylate, organic carboxylate, organic metal sulfonate, metal alkane complex, metal acylate and metal oxide.

24. The process according to embodiment 23, characterized in that the metallic catalyst (d1) is selected from the group consisting of bismuth carboxylate, zirconium carboxylate, aluminium carboxylate and dibutyltin dilaurate.

25. The process according to embodiment 22, characterized in that the non-metallic catalyst (d2) is selected from the group consisting of acetic acid, methane sulfonic acid, ethane sulfonic acid, 1-propane sulfonic acid, 1-butane sulfonic acid, trifluoromethane sulfonic acid, benzene sulfonic acid, p-toluene sulfonic acid, p-xylene-2-sulfonic acid, naphthalene-1-sulfonic acid, naphthalene-2-sulfonic acid, hydrochloric acid, sulfuric acid, phosphoric acid, triethylamine, pyridine, dimethylaminopyridine, lutidine imidazoles, 1,8-diazabycyclo[5.4.0]undec-7-en (DBU), 1,5-diazabicyclo(4.3.0)non-5-ene (DBN) and 1,4-Diazabicyclo[2.2.2] octane (DABCO).

26. The process according to embodiment 25, characterized in that the non-metallic catalyst (d2) is 1,8-diazabycyclo[5.4.0]undec-7-en (DBU).

27. The process according to one or more of embodiments 1 to 26, characterized in that the at least one polyalkylene glycol (a) is present in an amount in the range of $\geq 20$ wt.-% to $\leq 99$ wt.-% based on the total weight of the reaction feed stream.

28. The process according to one or more of embodiments 1 to 27, characterized in that the at least one compound selected from the group consisting of $C_4$ to $C_{30}$ alcohols, $C_4$ to $C_{30}$ alcohol alkoxylates and $C_4$ to $C_{30}$ alkyl phenol alkoxylates (b) is present in an amount in the range of $\geq 0.1$ wt.-% to $\leq 10$ wt.-% based on the total weight of the reaction feed stream.

29. The process according to one or more of embodiments 1 to 28, characterized in that the at least one polyisocyanate (c) is present in an amount in the range of $\geq 1$ wt.-% to $\leq 10$ wt.-% based on the total weight of the reaction feed stream.

30. The process according to one or more of embodiments 1 to 29, characterized in that the at least one catalyst (d) is present in an amount in the range of $\geq 0.01$ wt.-% to $\leq 5$ wt.-% based on the total weight of the reaction feed stream.

31. The process according to one or more of embodiments 1 to 30, characterized in that in the step (C) at least one diluent (e) is added.

32. The process according to embodiment 31, characterized in that the at least one diluent (e) is selected from the group consisting of alkali metal soaps of higher fatty acids, alkylaryl sulfonates such as sodium dodecyl benzene sulfonate, long chain fatty alcohol sulfates, olefin sulfates and olefin sulfonates, sulfated monoglycerides, sulfated esters, sulfonated ethoxylated alcohols, sulfosuccinates, alkane sulfonates, phosphate esters, alkyl isethionates, alkyl taurates, and alkyl sarcosinates, alkoxylated alcohols, and butyldiglycol.

33. The process according to embodiment 31 or 32, characterized in that the at least one diluent (e) is present in an amount in the range of $\geq 30$ wt.-% to $\leq 60$ wt.-% based on the total weight of the reaction feed stream.

34. The process according to one or more of embodiments 1 to 33, characterized in that in step (A) mixing is carried out by at least one mixer selected from the group consisting of a dynamic mixer and static mixer.

35. The process according to embodiment 34, characterized in that the at least one mixer is a static mixer.

36. The process according to embodiment 35, characterized in that the static mixer has a plurality of webs disposed on the inner surface of the static mixer.
37. The process according to one or more of embodiments 1 to 36, characterized in that in step (B) the at least one reactor is a static mixer having a plurality of webs disposed on the inner surface of the static mixer.
38. The process according to one or more of embodiments 1 to 37, characterized in that in step (C) the water is pre-heated and added to the polyurethane of step (B) in a static mixer having a plurality of webs disposed on the inner surface of the static mixer.
39. The process according to one or more of embodiments 38, characterized in that in step (C) the water is pre-heated at temperature in the range of ≥50° C. to ≤140° C.
40. The process according to one or more of embodiments 1 to 39 further comprising the step of:
    (D) cooling the polyurethane composition obtained in step (C) at a temperature in the range of ≥30° C. to ≤70° C.
41. The process according to embodiment 40, characterized in that in step (D) cooling takes place in the static mixer having a plurality of webs disposed on the inner surface of the static mixer.
42. The process according to one or more of embodiments 32 to 41, characterized in that the static mixer has a heat transfer rate in the range of ≥5 kW/K·m$^3$ to ≤250 kW/K·m$^3$.
43. The process according to one or more of embodiments 32 to 42, characterized in that the static mixer has a pressure drop in the range of ≥0.1 MPa to ≤6 MPa.
44. The process according to one or more of embodiments 1 to 43, characterized in that in step (A) the temperature is in the range of ≥60° C. to ≤80° C.
45. The process according to one or more of embodiments 1 to 44, characterized in that in step (B) the temperature in the range of ≥80° C. to ≤120° C.
46. The process according to one or more of embodiments 1 to 45, characterized in that in step (B) the residence time is in the range of ≥0.05 h to ≤2 h.
47. The process according to one or more of embodiments 1 to 46, characterized in that in at least one of step (A) and/or step (B) and/or step (C), independent of one another, at least one solubilizer (f) is added.
48. The process according to embodiment 47, characterized in that the at least one solubilizer (f) is selected from the group consisting of dimethylsulfoxide, sulfolan, N-methylpyrrolidone, (poly)alkyleneglycol dialkyl ethers, (poly)alkylene glycol monoalkyl ether, toluene, acetonitrile, tetrahydrofuran, butyltriglycol, propyleneglycol and mixtures thereof.
49. A polyurethane composition obtained by the process according to one or more of embodiments 1 to 48.
50. The polyurethane composition according to embodiment 49, characterized in that the composition comprises polyurethane in the range of ≥1 wt.-% to ≤50 wt.-% and water in the range of ≥25 wt.-% to ≤90 wt.-% based upon the total weight of the composition.
51. The polyurethane composition according to embodiment 50, further comprising oligosaccharides, biocides and complexing agents.
52. The polyurethane composition according to embodiment 51, characterized in that the complexing agents are selected from the group consisting of citric acid or a salt thereof, gluconic acid or a salt thereof, or a salt of ethylenediamine tetraacetic acid (EDTA salt).
53. The polyurethane composition according to embodiment 52, characterized in that the composition comprises polyurethane in the range of ≥10 wt.-% to ≤40 wt.-% based upon the total weight of the composition.
54. Use of the polyurethane composition according to one or more of embodiments 49 to 53 or the polyurethane composition obtained by the process according to one or more of embodiments 1 to 48 as rheology modifier.
55. A formulation comprising:
    (a) ≥0.01 wt.-% to ≤10 wt.-% of the polyurethane composition according to one or more of embodiments 49 to 53 or the polyurethane composition obtained by the process according to one or more of embodiments 1 to 48, and
    (b) ≥15 wt.-% to ≤99 wt.-% of at least one of the components, selected from the group consisting of pigments, fillers, binders, defoamers, neutralising agent, wetting agent, pigment dispersing agents, and water.
56. The formulation according to embodiment 55, characterized in that the formulation is a paint, lacquer, varnish, paper coating, wood coating, adhesive, cosmetic formulation, detergent formulation, textile and drilling muds plaster formulations, formulations for plasterboard, for hydraulic binders such as mortar formulations, formulations for ceramics and for leather.
57. Use of the formulation according to embodiment 55 or 56, as a thickener for water-borne coating formulations for achieving good thickening efficiency and a non-Newtonian rheology profile of the formulations.

DETAILED DESCRIPTION OF THE INVENTION

Before the present invention is described, it is to be understood that the terminology used herein is not intended to be limiting, since the scope of the present invention will be limited only by the appended embodiments.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

Furthermore, the terms "first", "second", "third" or "(a)", "(b)", "(c)", "(d)" etc. and the like in the description and in the embodiments, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein. In case the terms "first", "second", "third" or "(A)", "(B)" and "(C)" or "(a)", "(b)", "(c)", "(d)", "i", "ii" etc. relate to steps of a method or use or assay there is no time or time interval coherence between the steps, that is, the steps may be carried out simultaneously or there may be time intervals of seconds, minutes, hours, days, weeks, months or even years between such steps, unless otherwise indicated in the application as set forth herein above or below.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended embodiments, any of the claimed embodiments can be used in any combination.

The present invention is directed to a continuous process for preparing a polyurethane composition. The polyurethane composition acts as a rheology modifier additive for paint and coating formulations. The rheology additives ensure that the viscosity is not constant at different shear rates as in the case of a Newtonian fluid, but instead changes as a function of the prevailing shear rate, i.e. a non-Newtonian fluid.

Accordingly, an aspect of the present invention is directed to a continuous process for preparing a polyurethane composition comprising the steps of:

(A) mixing
  (a) at least one polyalkylene glycol having a water content in the range of ≥0 wt.-% to ≤0.1 wt.-% by weight of the at least one poly-alkylene glycol,
  (b) at least one compound selected from the group consisting of $C_4$ to $C_{30}$ alcohols, $C_4$ to $C_{30}$ alcohol alkoxylates and $C_4$ to $C_{30}$ alkyl phenol alkoxylates,
  (c) at least one polyisocyanate, and
  (d) at least one catalyst,
at a temperature in the range of ≥50° C. to ≤80° C. to obtain a reaction feed stream, (B) reacting the reaction feed stream of step (A) in at least one reactor at a temperature in the range of ≥80° C. to ≤150° C. and a residence time in the range of ≥0.05 h to ≤4 h to obtain a polyurethane, and (C) adding water to the polyurethane of step (B) to obtain a polyurethane composition, characterized in that the difference between the temperature in step (B) and the temperature in step (A) is at least 10° C.

For the purpose of the present invention, the term "Newtonian" refers to the linear behaviour of the strain rate with the rate of change of its deformation over time. By the term "non-Newtonian", it is referred to fluids which do not follow the Newton's law of viscosity. Typically, the viscosity of the non-Newtonian fluids is dependent on the shear rate. Moreover, the non-Newtonian fluids can even exhibit time-dependent viscosity.

Continuous processes in the sense of the invention are those in which the feed of the reactants into a reactor and the discharge of products from the reactor take place simultaneously, but at separate locations.

The term "reactants" hereinafter refers to one or more of the following components:
  (a) at least one polyalkylene glycol having a water content in the range of ≥0 wt.-% to ≤0.1 wt.-% by weight of the at least one polyalkylene glycol,
  (b) at least one compound selected from the group consisting of $C_4$ to $C_{30}$ alcohols, $C_4$ to $C_{30}$ alcohol alkoxylates and $C_4$ to $C_{30}$ alkyl phenol alkoxylates,
  (c) at least one polyisocyanate, and
  (d) at least one catalyst.

Hereinafter, the step (A) of the process described hereinabove or hereinbelow may interchangeably be referred to as the mixing step. The term "mixing" refers to mechanical agitation of the reactants carried out in a vessel, not necessarily a reactor. Agitation means providing ample mixing to the reactants, which leads to better heat and mass distribution. In an embodiment of the present invention, mixing in step (A) is carried out by means of at least one mixer. Accordingly, the at least one mixer is selected from the group consisting of dynamic mixers and static mixers. For the purpose of the present invention, the at least one mixer is a static mixer, as described in the later part.

The polyurethane composition obtained from the process of the presently claimed invention exhibits good thickening efficiency which enables it to be employed for a wide range of applications in coating formulations such as, but not limited to, paint, lacquer, varnish, paper coating, wood coating, adhesive, cosmetic formulation, detergent formulation, textile, and ceramic leather.

The mixing step, as described hereinabove, requires the presence of the at least one polyalkylene glycol (a) having a water content in the range of ≥0.0 wt.-% to ≤0.1 wt.-% by weight of the at least one polyalkylene glycol (a), along with the other reactants, which are described hereinbelow. The presence of water in the at least one polyalkylene glycol (a) results in side reactions, thereby generating unwanted products which result in the overall reduction of the yield and selectivity of the desired product. By the term "desired product", it is referred to the polyurethane composition. Accordingly, the removal of water from the at least one polyalkylene glycol (a) is crucial. The at least one polyalkylene glycol (a) may have a water content in the range of ≥0.0 wt.-% to ≤0.1 wt.-% by weight of the at least one polyalkylene glycol (a). More preferably, the water content is in the range of ≥0.0 wt.-% to ≤0.05 wt.-% by weight of the at least one polyalkylene glycol (a). Most preferably, it is in the range of ≥0.0 wt.-% to ≤0.025 wt.-% by weight of the at least one polyalkylene glycol (a). In a particularly preferable embodiment, it is desired that the at least one polyalkylene glycol (a) does not contain any water. This implies that the at least one polyalkylene glycol (a) is free of any water therein.

The at least one polyalkylene glycol (a) is dried in order to render it free of any water or to obtain the at least one polyalkylene glycol (a) having a water content in the range of >0 wt.-% to ≤0.1 wt.-% by weight of the at least one polyalkylene glycol (a). By the term "dried", it is referred to heating techniques which result in removal and/or reduction of the amount of water in the at least one polyalkylene glycol (a). Such heating techniques are well known to the person skilled in the art and therefore the choice of such techniques does not limit the present invention. For instance, a thin film evaporator may be employed for such techniques. Suitable process conditions and/or parameters for such heating techniques are well known to the person skilled in the art. Further, the term "free of any water" in the at least one polyalkylene glycol (a) refers to the absence of water entirely or to an extent that it is only in an amount ≤0.1 wt.-% by weight of the at least one polyalkylene glycol (a).

The amount of water in the at least one polyalkylene glycol (a) is so low that it does not reacts with any of the reactants, as described hereinabove or hereinbelow, thereby not affecting the final product.

For the purpose of the present invention, the term "poly-alkylene glycol", as described hereinabove and/or hereinbelow, refers to a structure containing monomer units represented by the following general formula (I):

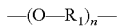 (I), wherein $R_1$ denotes an alkylene group and n denotes the number of repetitions.

Typically, the alkylene group may be, such as but not limited to, a methylene group, an ethylene group, a propylene group, a trimethylene group, and a cyclohexylene group. The number denoted by n is an integer and may be in the range of ≥5 to ≤250, preferably in the range of ≥50 to ≤100, and more preferably in the range of ≥100 to ≤220.

The at least one polyalkylene glycol (a) has a weight average molecular weight Mw in the range of ≥2,000 g/mol to ≤100,000 g/mol determined according to DIN 55672-1. Preferably, Mw is in the range of ≥3,000 g/mol to ≤100,000 g/mol, or ≥3,000 g/mol to ≤90,000 g/mol, or ≥3,000 g/mol to ≤80,000 g/mol, or ≥3,000 g/mol to ≤70,000 g/mol, or ≥3,000 g/mol to ≤60,000 g/mol determined according to DIN 55672-1. More preferably, it is in the range of ≥4,000 g/mol to ≤60,000 g/mol, or ≥4,000 g/mol to ≤50,000 g/mol, or ≥4,000 g/mol to ≤40,000 g/mol, or ≥4,000 g/mol to ≤35,000 g/mol, or ≥4,000 g/mol to ≤30,000 g/mol determined according to DIN 55672-1. Most preferably, it is in the range of ≥4,000 g/mol to ≤25,000 g/mol, or ≥6,000 g/mol to ≤25,000 g/mol, or ≥6,000 g/mol to ≤20,000 g/mol, or ≥6,000 g/mol to ≤15,000 g/mol, or ≥6,000 g/mol to ≤10,000 g/mol determined according to DIN 55672-1. In a particularly preferable embodiment, the at least one polyalkylene glycol (a) has a weight average molecular weight Mw in the range of ≥7,000 g/mol to ≤9,000 g/mol determined according to DIN 55672-1.

In an embodiment, the at least one polyalkylene glycol (a), as described hereinabove, may be, such as but not limited to, polyethylene glycol, polypropylene glycol, copolymer of ethylene oxide and propylene oxide and ether compounds of polyalkylene glycols and combinations thereof.

In a particularly preferable embodiment, the at least one polyalkylene glycol (a) is polyethylene glycol. Polyethylene glycol or PEG is a polyether compound and may be obtained by any method known to a person skilled in the art. However, typically PEG is produced by the interaction of ethylene oxide with water, ethylene glycol or ethylene glycol oligomers. The reaction is catalysed by acidic or basic catalysts. Ethylene glycol and its oligomers are preferable as a starting material instead of water, because they allow the creation of polymers with low polydispersity. As is known in the art, the term "polydispersity" refers to a polydispersity index which is a measure of the distribution of the molecular mass in a given polymer sample and is typically a ratio of the weight average molecular weight Mw and number average molecular weight Mn.

For the purpose of the present invention, the polyethylene glycol can have a weight average molecular weight Mw in the range of ≥2,000 g/mol to ≤100,000 g/mol determined according to DIN 55672-1. Preferably, Mw is in the range of ≥3,000 g/mol to ≤100,000 g/mol, or ≥3,000 g/mol to ≤90,000 g/mol, or ≥3,000 g/mol to ≤80,000 g/mol, or ≥3,000 g/mol to ≤70,000 g/mol, or ≥3,000 g/mol to ≤60,000 g/mol determined according to DIN 55672-1. More preferably, it is in the range of ≥4,000 g/mol to ≤60,000 g/mol, or ≥4,000 g/mol to ≤50,000 g/mol, or ≥4,000 g/mol to ≤40,000 g/mol, or ≥4,000 g/mol to ≤35,000 g/mol, or ≥4,000 g/mol to ≤30,000 g/mol determined according to DIN 55672-1. Most preferably, it is in the range of ≥4,000 g/mol to ≤25,000 g/mol, or ≥6,000 g/mol to ≤25,000 g/mol, or ≥6,000 g/mol to ≤20,000 g/mol, or ≥6,000 g/mol to ≤15,000 g/mol, or ≥6,000 g/mol to ≤10,000 g/mol determined according to DIN 55672-1. In a particularly preferable embodiment, the polyethylene glycol has a weight average molecular weight Mw in the range of ≥7,500 g/mol to ≤9,500 g/mol determined according to DIN 55672-1. Suitable methods for obtaining PEG having Mw in the prescribed range is well known to the person skilled in the art and therefore, the present invention is not limited by the same.

Accordingly, in a preferred embodiment, the continuous process for preparing a polyurethane composition comprises the steps of:

(A) mixing
  (a) polyethylene glycol having a water content in the range of ≥0 wt-% to ≤0.1 wt.-% by weight of the at least one poly-alkylene glycol,
  (b) at least one compound selected from the group consisting of $C_4$ to $C_{30}$ alcohols, $C_4$ to $C_{30}$ alcohol alkoxylates and $C_4$ to $C_{30}$ alkyl phenol alkoxylates,
  (c) at least one polyisocyanate, and
  (d) at least one catalyst,
  at a temperature in the range of ≥50° C. to ≤80° C. to obtain a reaction feed stream, (B) reacting the reaction feed stream of step (A) in at least one reactor at a temperature in the range of ≥80° C. to ≤150° C. and a residence time in the range of ≥0.05 h to ≤4 h to obtain a polyurethane, and (C) adding water to the polyurethane of step (B) to obtain a polyurethane composition, characterized in that the difference between the temperature in step (B) and the temperature in step (A) is at least 10° C. and wherein the weight average molecular weight Mw of the polyethylene glycol is in the range of ≥2,000 g/mol to ≤100,000 g/mol determined according to DIN 55672-1.

In yet another preferred embodiment, the continuous process for preparing a polyurethane composition comprises the steps of:

(A) mixing
  (a) polyethylene glycol having a water content in the range of ≥0 wt-% to ≤0.1 wt.-% by weight of the at least one poly-alkylene glycol,
  (b) at least one compound selected from the group consisting of $C_4$ to $C_{30}$ alcohols, $C_4$ to $C_{30}$ alcohol alkoxylates and $C_4$ to $C_{30}$ alkyl phenol alkoxylates,
  (c) at least one polyisocyanate, and
  (d) at least one catalyst,
  at a temperature in the range of ≥50° C. to ≤80° C. to obtain a reaction feed stream, (B) reacting the reaction feed stream of step (A) in at least one reactor at a temperature in the range of ≥80° C. to ≤150° C. and a residence time in the range of ≥0.05 h to ≤4 h to obtain a polyurethane, and (C) adding water to the polyurethane of step (B) to obtain a polyurethane composition, characterized in that the difference between the temperature in step (B) and the temperature in step (A) is at least 10° C. and wherein the weight average molecular weight Mw of the polyethylene glycol is in the range of ≥7,500 g/mol to ≤9,500 g/mol determined according to DIN 55672-1.

In a preferred embodiment, the at least one compound (b) is a $C_4$ to $C_{30}$ aliphatic alcohol, more preferably a $C_6$ to $C_{14}$ aliphatic alcohol.

Accordingly, in a preferred embodiment, the continuous process for preparing a polyurethane composition comprises the steps of:
(A) mixing
  (a) at least one polyalkylene glycol having a water content in the range of $\geq 0$ wt.-% to $\leq 0.1$ wt.-% by weight of the at least one poly-alkylene glycol,
  (b) at least one $C_4$ to $C_{30}$ aliphatic alcohol, more preferably at least one $C_6$ to $C_{14}$ aliphatic alcohol,
  (c) at least one polyisocyanate, and
  (d) at least one catalyst,
  at a temperature in the range of $\geq 50°$ C. to $\leq 80°$ C. to obtain a reaction feed stream,
(B) reacting the reaction feed stream of step (A) in at least one reactor at a temperature in the range of $\geq 80°$ C. to $\leq 150°$ C. and a residence time in the range of $\geq 0.05$ h to $\leq 4$ h to obtain a polyurethane, and
(C) adding water to the polyurethane of step (B) to obtain a polyurethane composition, characterized in that the difference between the temperature in step (B) and the temperature in step (A) is at least $10°$ C.

Preferred $C_4$ to $C_{30}$ aliphatic alcohols can be selected from the group consisting of n-butanol, n-pentanol, n-hexanol, n-heptanol, n-octanol, n-nonanol, n-decanol, n-undecanol, n-dodecanol, n-tridecanol, n-tetradecanol, n-pentadecanol, n-hexadecanol, n-heptadecanol, n-octadecanol, n-nonadecanol, n-eicosanol, n-heneicosanol, n-docosanol, n-tricosanol, n-tetracosanol, n-pentacosanol, n-hexacosanol, n-heptacosanol, n-octacosanol, n-nonacosanol, n-triacontanol, iso-butanol, iso-pentanol, iso-hexanol, iso-heptanol, iso-octanol, iso-nonanol, iso-decanol, iso-undecanol, iso-dodecanol, iso-tridecanol, iso-tetradecanol, iso-pentadecanol, iso-hexadecanol, iso-heptadecanol, iso-octadecanol, iso-nonadecanol, iso-eicosanol, iso-heneicosanol, iso-docosanol, iso-tricosanol, iso-tetracosanol, iso-pentacosanol, iso-hexacosanol, iso-heptacosanol, iso-octacosanol, iso-nonacosanol, iso-triacontanol, 2-methyl-1-pentanol, 2-ethyl-1-hexanol, 2-propyl-1-heptanol, 2-butyl-1-octanol, 2-pentyl-1-nonanol, 2-hexyl-1-decanol, 2-heptyl-1-undecanol, 2-octyl-1-dodecanol, 2-nonyl-1-tridecanol, 2-decyl-1-tetradecanol, 2-undecyl-1-pentadecanol, 2-dodecyl-1-hexadecanol and 2-tridecyl-1-heptadecanol.

More preferably, the compound (b) is a $C_6$ to $C_{18}$ aliphatic alcohol which is selected from the group consisting of n-hexanol, n-heptanol, n-octanol, n-nonanol, n-decanol, n-undecanol, n-dodecanol, n-tridecanol, n-tetradecanol, iso-hexanol, iso-heptanol, iso-octanol, iso-nonanol, iso-decanol, iso-undecanol, iso-dodecanol, iso-tridecanol, iso-tetradecanol, 2-methyl-1-pentanol, 2-ethyl-1-hexanol, 2-propyl-1-heptanol, 2-butyl-1-octanol and 2-pentyl-1-nonanol.

Particularly preferably, the compound (b) is a $C_6$ to $C_{10}$ aliphatic alcohol which is selected from the group consisting of n-hexanol, n-heptanol, n-octanol, n-nonanol, n-decanol, n-undecanol, n-dodecanol, n-tridecanol, n-tetradecanol, iso-hexanol, iso-heptanol, iso-octanol, iso-nonanol and iso-decanol.

In one preferred embodiment, the continuous process for preparing a polyurethane composition comprises the steps of:
(A) mixing
  (a) at least one polyalkylene glycol having a water content in the range of $\geq 0$ wt.-% to $\leq 0.1$ wt.-% by weight of the at least one poly-alkylene glycol,
  (b) hexanol,
  (c) at least one polyisocyanate, and
  (d) at least one catalyst,
  at a temperature in the range of $\geq 50°$ C. to $\leq 80°$ C. to obtain a reaction feed stream,
(B) reacting the reaction feed stream of step (A) in at least one reactor at a temperature in the range of $\geq 80°$ C. to $\leq 150°$ C. and a residence time in the range of $\geq 0.05$ h to $\leq 4$ h to obtain a polyurethane, and
(C) adding water to the polyurethane of step (B) to obtain a polyurethane composition, characterized in that the difference between the temperature in step (B) and the temperature in step (A) is at least $10°$ C.

In another preferred embodiment, the continuous process for preparing a polyurethane composition comprises the steps of:
(A) mixing
  (a) at least one polyalkylene glycol having a water content in the range of $\geq 0$ wt.-% to $\leq 0.1$ wt.-% by weight of the at least one poly-alkylene glycol,
  (b) decanol,
  (c) at least one polyisocyanate, and
  (d) at least one catalyst,
  at a temperature in the range of $\geq 50°$ C. to $\leq 80°$ C. to obtain a reaction feed stream,
(B) reacting the reaction feed stream of step (A) in at least one reactor at a temperature in the range of $\geq 80°$ C. to $\leq 150°$ C. and a residence time in the range of $\geq 0.05$ h to $\leq 4$ h to obtain a polyurethane, and
(C) adding water to the polyurethane of step (B) to obtain a polyurethane composition, characterized in that the difference between the temperature in step (B) and the temperature in step (A) is at least $10°$ C.

In another preferred embodiment, the at least one compound (b) is at least one $C_4$ to $C_{30}$ alcohol alkoxylate. Preferably, $C_4$ to $C_{30}$ alcohol alkoxylates are compounds of the general formula I, $$R_1-(O-CH_2-CH_2)_q O-CH(CH_3)-CH_2)_r-OH \quad (1)$$

wherein
$R_1$ is a substituted or unsubstituted, linear or branched, alkyl or alkenyl having 4 to 30 carbon atoms;
q is an integer in the range of $\geq 1$ to $\leq 50$; and
r is 0 or an integer in the range of $\geq 1$ to $\leq 30$, with the proviso that $2 \leq q+r \leq 80$.

In another embodiment, the at least compound (b) is at least one $C_4$ to $C_{30}$ alkyl phenol alkoxylate. Suitable $C_4$ to $C_{30}$ alkyl phenol alkoxylates are compounds of the general formula (II), wherein,
R is a substituted or unsubstituted, linear or branched, alkyl or alkenyl having 4 to 30 carbon atoms, and
x is an integer in the range of $\geq 1$ to $\leq 15$.

The at least one polyisocyanate (c) is also mixed along with the other reactants in the mixing step.

For the purpose of the present invention, the term "polyisocyanate" refers to molecules having more than one isocyanate (NCO) groups. That is, to say, the at least one polyisocyanate (c) comprises a plurality of NCO functional groups, e.g. 2, 3, 4, 5, 6, 7 or 8 functional groups, or any value or ranges of values therein.

For the purpose of the present invention, the at least one polyisocyanate (c) is selected from the group consisting of aliphatic polyisocyanates (c1) and aromatic polyisocyanates (c2). By the term "aromatic polyisocyanate", it is referred to molecules having two or more isocyanate groups attached directly and/or indirectly to the aromatic ring. Further, it is to be understood that the at least one polyisocyanate (c) includes both monomeric and polymeric forms of the aliphatic polyisocyanate (c1) and aromatic polyisocyanate (c2). By the term "polymeric", it is referred to the polymeric grade of the aliphatic polyisocyanate (c1) and/or aromatic polyisocyanate (c2) comprising, independently of each other, different oligomers and homologues.

The at least one polyisocyanate (c) may have any % NCO content, any nominal functionality, any number average molecular weight and any viscosity, depending on which at least one polyisocyanate (c), as described hereinabove, is chosen. Hereinbelow, the term "% NCO content" may be interchangeably referred to as isocyanate content or NCO content. Preferably, the % NCO content of the at least one polyisocyanate (c) is in the range of ≥2 wt.-% to ≤50 wt.-%, more preferably in the range of ≥6 wt.-% to ≤45 wt.-%. Determination of the % NCO contents on percent by weight is accomplished by standard chemical titration analysis known to those skilled in the art and therefore, the present invention is not limited by any such methods.

The aliphatic polyisocyanate (c1) can comprise 6 to 100 carbon atoms linked in a straight chain or cyclized and having two or more isocyanate groups. In an embodiment, the aliphatic polyisocyanate (c1) is selected from the group consisting of tetramethylene 1,4-diisocyanate, pentamethylene 1,5-diisocyanate, hexamethylene 1,6-diisocyanate, decamethylene diisocyanate, 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate, cyclobutane-1,3-diisocyanate, 1,2-, 1,3- and 1,4-cyclohexane diisocyanates, 2,4- and 2,6-methylcyclohexane diisocyanate, 4,4'- and 2,4'-dicyclohexyldiisocyanates, 1,3,5-cyclohexane triisocyanates, isocyanatomethylcyclohexane isocyanates, isocyanatoethylcyclohexane isocyanates, bis(isocyanatomethyl)-cyclohexane diisocyanates, 4,4'-diisocyanatodicyclohexylmethane, hexamethylene 1,6-diisocyanate, pentamethylene 1,5-diisocyanate, isophorone diisocyanate, and mixtures thereof.

Preferably, the aliphatic polyisocyanate (c1) is selected from the group consisting of hexamethylene 1,6-diisocyanate, decamethylene diisocyanate, 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate, cyclobutane-1,3-diisocyanate, 1,2-, 1,3- and 1,4-cyclohexane diisocyanates, 2,4- and 2,6-methylcyclohexane diisocyanate, 4,4'- and 2,4'-dicyclohexyldiisocyanates, isocyanatomethylcyclohexane isocyanates, isocyanatoethylcyclohexane isocyanates, bis(isocyanatomethyl)-cyclohexane diisocyanates, 4,4'-diisocyanatodicyclohexylmethane, hexamethylene 1,6-diisocyanate, pentamethylene 1,5-diisocyanate and isophorone diisocyanate.

More preferably, the aliphatic polyisocyanate (c1) is selected from the group consisting of hexamethylene 1,6-diisocyanate, decamethylene diisocyanate, 2,2,4-trimethyl-hexamethylene diisocyanate, 2,4,4-trimethyl-hexamethylene diisocyanate, 2-methyl-1,5-pentamethylene diisocyanate, 1,2-, 1,3- and 1,4-cyclohexane diisocyanates, 2,4- and 2,6-methylcyclohexane diisocyanate, 4,4'- and 2,4'-dicyclohexyldiisocyanates, isocyanatoethylcyclohexane isocyanates, bis(isocyanatomethyl)-cyclohexane diisocyanates, 4,4'-diisocyanatodicyclohexylmethane, hexamethylene 1,6-diisocyanate, pentamethylene 1,5-diisocyanate and isophorone diisocyanate.

Most preferably, the aliphatic polyisocyanate (c1) is selected from the group consisting of hexamethylene 1,6-diisocyanate, 2,2,4-trimethyl-hexamethylene diisocyanate, 2,4,4-trimethyl-hexamethylene diisocyanate, 1,2-, 1,3- and 1,4-cyclohexane diisocyanates, 2,4- and 2,6-methylcyclohexane diisocyanate, 4,4'- and 2,4'-dicyclohexyldiisocyanates, bis(isocyanatomethyl)-cyclohexane diisocyanates, 4,4'-diisocyanatodicyclohexylmethane, hexamethylene 1,6-diisocyanate, pentamethylene 1,5-diisocyanate and isophorone diisocyanate.

Particularly preferably, the aliphatic polyisocyanate (c1) as the at least one polyisocyanate (c) is 4,4'-diisocyanatodicyclohexylmethane (H12MDI) and/or isophorone diisocyanate (IPDI).

Accordingly, in a preferred embodiment, the continuous process for preparing a polyurethane composition comprises the steps of:

(A) mixing (a) at least one polyalkylene glycol having a water content in the range of ≥0 wt.-% to ≤0.1 wt.-% by weight of the at least one poly-alkylene glycol, (b) at least one compound selected from the group consisting of $C_4$ to $C_{30}$ alcohols, $C_4$ to $C_{30}$ alcohol alkoxylates and $C_4$ to $C_{30}$ alkyl phenol alkoxylates, (c1) at least one aliphatic polyisocyanate, and (d) at least one catalyst, at a temperature in the range of ≥50° C. to ≤80° C. to obtain a reaction feed stream, (B) reacting the reaction feed stream of step (A) in at least one reactor at a temperature in the range of ≥80° C. to ≤150° C. and a residence time in the range of ≥0.05 h to ≤4 h to obtain a polyurethane, and (C) adding water to the polyurethane of step (B) to obtain a polyurethane composition, characterized in that the difference between the temperature in step (B) and the temperature in step (A) is at least 10° C.

In another preferred embodiment, the continuous process for preparing a polyurethane composition comprises the steps of:

(A) mixing (a) at least one polyalkylene glycol having a water content in the range of ≥0 wt.-% to ≤0.1 wt.-% by weight of the at least one poly-alkylene glycol, (b) at least one compound selected from the group consisting of $C_4$ to $C_{30}$ alcohols, $C_4$ to $C_{30}$ alcohol alkoxylates and $C_4$ to $C_{30}$ alkyl phenol alkoxylates, (c) H12MDI, and (d) at least one catalyst, at a temperature in the range of ≥50° C. to ≤80° C. to obtain a reaction feed stream, (B) reacting the reaction feed stream of step (A) in at least one reactor at a temperature in the range of ≥80° C. to ≤150° C. and a residence time in the range of ≥0.05 h to ≤4 h to obtain a polyurethane, and (C) adding water to the polyurethane of step (B) to obtain a polyurethane composition, characterized in that the difference between the temperature in step (B) and the temperature in step (A) is at least 10° C.

In another preferred embodiment, the continuous process for preparing a polyurethane composition comprises the steps of:
(A) mixing
  (a) at least one polyalkylene glycol having a water content in the range of ≥0 wt.-% to ≤0.1 wt.-% by weight of the at least one poly-alkylene glycol,
  (b) at least one compound selected from the group consisting of $C_4$ to $C_{30}$ alcohols, $C_4$ to $C_{30}$ alcohol alkoxylates and $C_4$ to $C_{30}$ alkyl phenol alkoxylates I,
  (c) IPDI, and
  (d) at least one catalyst,
  at a temperature in the range of ≥50° C. to ≤80° C. to obtain a reaction feed stream,
(B) reacting the reaction feed stream of step (A) in at least one reactor at a temperature in the range of ≥80° C. to ≤150° C. and a residence time in the range of ≥0.05 h to ≤4 h to obtain a polyurethane, and
(C) adding water to the polyurethane of step (B) to obtain a polyurethane composition, characterized in that the difference between the temperature in step (B) and the temperature in step (A) is at least 10° C.

Suitable aromatic polyisocyanates (c2), for the purpose of the present invention, are selected from the group consisting of 2,4- and 2,6-hexahydrotoluenediisocyanate, 1,2-, 1,3-, and 1,4-phenylene diisocyanates, triphenyl methane-4,4',4''-triisocyanate, naphthylene-1,5-diisocyanate, 2,4- and 2,6-toluene diisocyanate, 2,4'-, 4,4'- and 2,2-biphenyl diisocyanates, 2,2'-, 2,4'- and 4,4'-diphenylmethane diisocyanate, polyphenyl polymethylene polyisocyanates, 1,2-, 1,3- and 1,4-xylylene diisocyanates and m-tetramethylxylyene diisocyanate (TMXDI), and mixtures thereof.

In addition to the above components, at least one catalyst (d) can be added during the mixing step.

The at least one catalyst (d) lowers the activation energy for the addition reaction with the isocyanate component and so the reaction can be carried out at lower temperatures and hence with greater technical reliability with regard to the possible polymerization. The addition reaction of the compound bearing the isocyanate group with a compound bearing the hydroxyl group, leading to the formation of urethane groups, can be accelerated in a conventional manner by means of suitable catalysts such as, but not limited to, tin octoate, dibutyltin dilaurate or tertiary amines such as dimethylbenzylamine or any other catalyst known to the person skilled in the art. Further catalysts are described in, for example, Houben-Weyl, Methoden der Organischen Chemie, Vol. XIV/2, Thieme-Verlag, Stuttgart 1963, p. 60f. and also Ullmanns Enzyklopädie der Technischen Chemie, 4$^{th}$ edn., Vol. 19 (1981), p. 306. Additionally, it is also to be understood that the at least one catalyst may be obtained by any suitable method known to the person skilled in the art and, therefore, the choice of such method does not limit the present invention.

The at least one catalyst (d) for the purpose of the present invention can be selected from the group consisting of metallic catalyst (d1) and non-metallic catalyst (d2). As is known, the terms "metallic catalyst" and "non-metallic catalyst" have their usual meanings known to the person skilled in the art. In an embodiment, the metallic catalyst (d1) is selected from the group consisting of metal carbonate, metal borate, metal carboxylate, organic carboxylate, organic metal sulfonate, metal alkane complex, metal acylate and metal oxide.

Accordingly, in a preferred embodiment, the continuous process for preparing a polyurethane composition comprises the steps of:
(A) mixing
  (a) at least one polyalkylene glycol having a water content in the range of ≥0 wt.-% to ≤0.1 wt.-% by weight of the at least one poly-alkylene glycol,
  (b) at least one compound selected from the group consisting of $C_4$ to $C_{30}$ alcohols, $C_4$ to $C_{30}$ alcohol alkoxylates and $C_4$ to $C_{30}$ alkyl phenol alkoxylates,
  (c) at least one polyisocyanate, and
  (d1) at least one metallic catalyst,
  at a temperature in the range of ≥50° C. to ≤80° C. to obtain a reaction feed stream,
(B) reacting the reaction feed stream of step (A) in at least one reactor at a temperature in the range of ≥80° C. to ≤150° C. and a residence time in the range of ≥0.05 h to ≤4 h to obtain a polyurethane, and
(C) adding water to the polyurethane of step (B) to obtain a polyurethane composition, characterized in that the difference between the temperature in step (B) and the temperature in step (A) is at least 10° C.

In a preferred embodiment, the metallic catalyst (d1) is selected from the group consisting of metal carbonate, metal borate, metal carboxylate, organic carboxylate, organic metal sulphonate, metal alkane complex, metal acylate and metal oxide.

In another preferred embodiment, the metallic catalyst (d1) is selected from the group consisting of bismuth carboxylate, zirconium carboxylate, aluminium carboxylate and dibutyltin dilaurate.

In another preferred embodiment, the continuous process for preparing a polyurethane composition comprises the steps of:
(A) mixing
  (a) at least one polyalkylene glycol having a water content in the range of ≥0 wt.-% to ≤0.1 wt.-% by weight of the at least one poly-alkylene glycol,
  (b) at least one $C_4$ to $C_{30}$ aliphatic alcohol, more preferably at least one $C_6$ to $C_{14}$ aliphatic alcohol,
  (c) at least one polyisocyanate, and
  (d2) at least one non-metallic catalyst,
  at a temperature in the range of ≥50° C. to ≤80° C. to obtain a reaction feed stream,
(B) reacting the reaction feed stream of step (A) in at least one reactor at a temperature in the range of ≥80° C. to ≤150° C. and a residence time in the range of ≥0.05 h to ≤4 h to obtain a polyurethane, and
(C) adding water to the polyurethane of step (B) to obtain a polyurethane composition, characterized in that the difference between the temperature in step (B) and the temperature in step (A) is at least 10° C.

Other compounds which can be used as the at least one catalyst (d) include triethanolamine, triisopropanolamine, N-methyl- and N-ethyldiethanolamine, dimethylaminoethanol, 2(N,N-dimethylaminoethoxy)ethanol, N,N',N-tri(dialkylaminoalkyl)hexahydrotriazines, such as N,N',N-tris(dimethylaminopropyl)-s-hexahydrotriazine; iron(II)chloride, zinc chloride, lead octoate and tin salts, such as tin dioctoate, tin diethylhexanoate, dibutyltin dilaurate and dibutyldilauryltin mercaptide, 2,3-dimethyl-3,4,5,6-tetrahydropyrimidine, tetraalkylammonium hydroxides, such as tetramethylammonium hydroxide; alkali metal hydroxides, such as sodium methoxide and potassium isopropoxide; and/or alkali metal salts of long-chain fatty acids having 10 to 20 carbon atoms and, optionally, pendant OH groups.

Further compounds which have been found suitable for use as the at least one catalyst (d) include Ti compounds, such as Ti(IV)—O-alkyl compounds with alkyl groups, such as methyl, ethyl, n-propyl, isopropyl, n-butyl, isobutyl, tert-butyl, n-pentyl, 2-pentyl, 3-pentyl, ethyl, n-propyl, isopropyl, n-butyl, isobutyl, tert-butyl and Ti(IV)butoxide.

Suitable organometallic compounds of tin, lead, iron, titanium, bismuth or zirconium may be used as catalyst, and include tetraisopropyl titanate, lead phenylethyldithiocarbamate, tin(II) salts of carboxylic acids, such as tin(II) acetate, ethylhexoate and diethylhexoate, for example. A further class of compound is represented by the dialkyltin (IV) carboxylates. Additionally, tin oxides, tin sulphides and tin thiolates may be used. Specific compounds include the following: bis(tributyltin)oxide, bis(trioctyltin)oxide, dibutyltin and dioctyltin bis(2-ethylhexyl thiolate), dibutyltin and dioctyltin didodecylthiolate, bis($\beta$-methoxycarbonylethyl)tin didodecylthiolate, bis($\beta$-acetylethyl)tin bis(2-ethylhexylthiolate), dibutyltin and dioctyltin didodecylthiolate, butyltin and octyltin tris(thioglycolic acid-2-ethylhexoate), dibutyl- and dioctyltin-bis(thioglycolic acid 2-ethylhexoate), tributyl- and trioctyltin(thioglycolic acid 2-ethylhexoate), butyltin and octyltin tris(thioethylene glycol 2-ethylhexoate), dibutyltin and dioctyltin bis(thioethylene glycol-2-ethylhexoate), tributyltin and trioctyltin(thioethylene glycol 2-ethylhexoate) with the general formula $R_{n+1}Sn(SCH_2CH_2OCOC_8H_{17})_{3-n}$, where R is an alkyl group having 4 to 8 carbon atoms, bis($\beta$-methoxycarbonylethyl)tin bis(thioethylene glycol 2-ethylhexoate), bis($\beta$-methoxycarbonylethyl)tin bis(thioglycolic acid 2-ethylhexoate), bis($\beta$-acetylethyl)tin bis(thioethylene glycol 2-ethylhexoate) and bis($\beta$-acetylethyl)tin bis(thioglycolic acid 2-ethylhexoate).

Organobismuth compounds used are, in particular, bismuth carboxylates carboxylic acids possessing 2 to 20 carbon atoms, and preferably 4 to 14 atoms. The carboxylic acids have 2, preferably at least 10, and most preferably 14 to 32 carbon atoms. Dicarboxylic acids can also be used. Specific acids that may be mentioned include the following: adipic acid, maleic acid, fumaric acid, malonic acid, succinic acid, pimelic acid, terephthalic acid, phenylacetic acid, benzoic acid, acetic acid, propionic acid, 2-ethylhexanoic, caprylic, capric, lauric, myristic, palmitic and stearic acid. Acids also include the following: butyric acid, caproic acid, caprylic acid, capric acid, lauric acid, myristic acid, palmitic acid, stearic acid, arachidic acid, isobutyric acid and 2-ethylhexanoic acid. It is also possible to use mixtures of bismuth carboxylates with other metal carboxylates, such as tin carboxylates.

Preferably, the non-metallic catalyst (d2) is selected from the group consisting of acetic acid, methane sulfonic acid, ethane sulfonic acid, 1-propane sulfonic acid, 1-butane sulfonic acid, trifluoromethane sulfonic acid, benzene sulfonic acid, p-toluene sulfonic acid, p-xylene-2-sulfonic acid, naphthalene-1-sulfonic acid, naphthalene-2-sulfonic acid, hydrochloric acid, sulfuric acid, phosphoric acid, triethylamine, pyridine, dimethylaminopyridine, lutidine imidazoles, 1,8-diazabycyclo[5.4.0]undec-7-en (DBU), 1,5-diazabicyclo(4.3.0)non-5-ene (DBN) and 1,4-Diazabicyclo[2.2.2]octane (DABCO).

More preferably, the non-metallic catalyst (d2) is selected from the group consisting of 1-propane sulfonic acid, 1-butane sulfonic acid, trifluoromethane sulfonic acid, benzene sulfonic acid, p-toluene sulfonic acid, p-xylene-2-sulfonic acid, naphthalene-1-sulfonic acid, naphthalene-2-sulfonic acid, hydrochloric acid, sulfuric acid, phosphoric acid, triethylamine, pyridine, dimethylaminopyridine, lutidine imidazoles, 1,8-diazabycyclo[5.4.0]undec-7-en (DBU), 1,5-diazabicyclo(4.3.0)non-5-ene (DBN) and 1,4-diazabicyclo[2.2.2]octane (DABCO).

Most preferably, the non-metallic catalyst (d2) is selected from the group consisting of sulfuric acid, phosphoric acid, triethylamine, pyridine, dimethylaminopyridine, lutidine imidazoles, 1,8-diazabycyclo[5.4.0]undec-7-en (DBU), 1,5-diazabicyclo(4.3.0)non-5-ene (DBN) and 1,4-diazabicyclo[2.2.2]octane (DABCO).

In a preferred embodiment, the non-metallic catalyst (d2) is 1,8-diazabycyclo[5.4.0]undec-7-en (DBU). Particularly preferably, DBU and/or its derivative are suitable as the non-metallic catalyst (d2) in the at least one catalyst (d). The various derivatives or reaction products of DBU which can be utilized in the present invention as the at least one catalyst (d) include the reaction product of DBU with phenol, as well as with various other acidic compounds. Such acidic compounds include the various sulfonic acids such as p-toluenesulfonic, sulfimides, sulfamides, phosphonic acids, the various N-sulfonylcarboxamides which have a total of from 2 to about 36 carbon atoms, and the various carboxylic acids which have a total of from 2 to 18 carbon atoms. The DBU compound or DBU derivative is a true catalyst and final properties of the present invention polyurethane composition remain unaffected by its presence.

Accordingly, in a preferred embodiment, the continuous process for preparing a polyurethane composition comprises the steps of:
(A) mixing
  (a) at least one polyalkylene glycol having a water content in the range of $\geq 0$ wt.-% to $\leq 0.1$ wt.-% by weight of the at least one polyalkylene glycol,
  (b) at least one compound selected from the group consisting of $C_4$ to $C_{30}$ alcohols, $C_4$ to $C_{30}$ alcohol alkoxylates and $C_4$ to $C_{30}$ alkyl phenol alkoxylates,
  (c) at least one polyisocyanate, and
  (d) 1,8-diazabycyclo[5.4.0]undec-7-en,
  at a temperature in the range of $\geq 50°$ C. to $\leq 80°$ C. to obtain a reaction feed stream,
(B) reacting the reaction feed stream of step (A) in at least one reactor at a temperature in the range of $\geq 80°$ C. to $\leq 150°$ C. and a residence time in the range of $\geq 0.05$ h to $\leq 4$ h to obtain a polyurethane, and
(C) adding water to the polyurethane of step (B) to obtain a polyurethane composition, characterized in that the difference between the temperature in step (B) and the temperature in step (A) is at least $10°$ C.

Suitable amounts of the reactants, as described hereinabove, are well known to the person skilled in the art.

In a preferred embodiment, the at least one polyalkylene glycol (a) is present in an amount in the range of $\geq 20$ wt.-% to $\leq 99$ wt.-% based on the total weight of the reaction feed stream. Preferably, it is present in an amount in the range of $\geq 60$ wt.-% to $\leq 98$. wt.-%. More preferably, in the range of $\geq 70$ wt.-% to $\leq 97$. wt.-%. Most preferably, in the range of $\geq 85$ wt.-% to $\leq 96$. wt.-%.

In another preferred embodiment, the at least one compound selected from the group consisting of $C_4$ to $C_{30}$ alcohols, $C_4$ to $C_{30}$ alcohol alkoxylates and $C_4$ to $C_{30}$ alkyl phenol alkoxylates (b), preferably the at least one $C_4$ to $C_{30}$ aliphatic alcohol, is present in an amount in the range of $\geq 0.1$ wt.-% to $\leq 10$ wt.-%, based on the total weight of the reaction feed stream. Preferably, it is present in an amount in the range of $\geq 0.5$ wt.-% to $\leq 9$. wt.-%. More preferably, in the range of $\geq 1.0$ wt.-% to $\leq 8.0$ wt.-%. Most preferably, in the range of $\geq 1.5$ wt.-% to $\leq 7$. wt.-%.

In another preferred embodiment, the at least one polyisocyanate (c) is present in an amount in the range of $\geq 1$ wt.-% to $\leq 10$ wt.-%, based on the total weight of the reaction feed stream. Preferably, it is present in an amount in the range of $\geq 1.5$ wt.-% to $\leq 9$. wt.-%. More preferably, in the range of ≥2.5 wt.-% to ≤8.5. wt.-%. Most preferably, in the range of ≥3.5 wt.-% to ≤7.5. wt.-%.

In yet another preferred embodiment, the at least one catalyst (d) is present in an amount in the range of ≥0.01 wt.-% to ≤5 wt.-%, based on the total weight of the reaction feed stream. Preferably, it is present in an amount in the range of ≥0.01 wt.-% to ≤3 wt.-%, or ≥0.01 wt.-% to ≤2 wt.-%. More preferably, in the range of ≥0.01 wt.-% to ≤1 wt.-%. Most preferably, in the range of ≥0.01 wt.-% to ≤0.3 wt.-%.

The temperature at which the reactants, described hereinabove, in step (A) are mixed is in the range of ≥50° C. to ≤80° C. to obtain the reaction feed stream. The term "reaction feed stream", as described hereinabove and hereinbelow, comprises the reactants in the mixing step, i.e. the reactants (a), (b), (c) and (d), wherein the said reactants are mixed at a temperature in the range of ≥50° C. to ≤80° C. Preferably, the temperature is in the range of ≥60° C. to ≤80° C.

For the purpose of the present invention, the reactants can be added in any order or sequence and in any manner, i.e. either dropwise or all at once. The person skilled in the art is well aware of the order, sequence and manner of addition and, therefore, the process of the present invention shall not be limited by the same. However, in a preferred embodiment in step (A):

(A1) the at least one polyalkylene glycol (a) is dried to a water content in the range of ≥0 wt.-% to ≤0.1 wt.-% by weight of the at least one polyalkylene glycol, to obtain at least one dried polyalkylene glycol (a), (A2) the at least one catalyst (d) is mixed with the at least compound selected from the group consisting of $C_4$ to $C_{30}$ alcohols, $C_4$ to $C_{30}$ alcohol alkoxylates and $C_4$ to $C_{30}$ alkyl phenol alkoxylates (b) to obtain a first mixture, (A3) the first mixture is mixed with the at least one polyisocyanate (c) to obtain a second mixture, and (A4) the second mixture is mixed with the at least one dried polyalkylene glycol (a) to obtain the reaction feed stream.

In a preferred embodiment of the mixing step of the present invention, the following temporal sequence of steps applies (A1)→(A2)→(A3)→(A4) which is heated at a temperature in the range of ≥50° C. to ≤80° C. to obtain the reaction feed stream. For instance, the temporal sequence of the steps described hereinabove may alternatively be (A2)→(A3)→(A1)→(A4). The choice of such temporal sequence is known to the person skilled in the art and therefore, it does not limit the present invention.

In another preferred embodiment, in the mixing step the at least one catalyst (d) is first mixed with the at least one compound selected from the group consisting of $C_4$ to $C_{30}$ alcohols, $C_4$ to $C_{30}$ alcohol alkoxylates and $C_4$ to $C_{30}$ alkyl phenol alkoxylates (b) to obtain a first mixture. The first mixture is then mixed with the at least one polyalkylene glycol (a) to obtain a second mixture. The second mixture is then mixed with the at least one polyisocyanate (c) to obtain the reaction feed stream, as described hereinabove.

In another preferred embodiment, in the mixing step the at least one catalyst (d) is first mixed with the at least one polyalkylene glycol (a) to obtain a first mixture. The first mixture is then mixed with at least one compound selected from the group consisting of $C_4$ to $C_{30}$ alcohols, $C_4$ to $C_{30}$ alcohol alkoxylates and $C_4$ to $C_{30}$ alkyl phenol alkoxylates (b) to obtain a second mixture. The second mixture is then mixed with the at least one polyisocyanate (c) to obtain the reaction feed stream, as described hereinabove.

In yet another preferred embodiment, in the mixing step the at least one compound selected from the group consisting of $C_4$ to $C_{30}$ alcohols, $C_4$ to $C_{30}$ alcohol alkoxylates and $C_4$ to $C_{30}$ alkyl phenol alkoxylates (b) is first mixed with the at least one polyalkylene glycol (a) to obtain a first mixture. The first mixture is then mixed with the at least one polyisocyanate (c) to obtain a second mixture. The second mixture is then mixed with the at least one catalyst (d) to obtain the reaction feed stream, as described hereinabove.

In a preferred embodiment, in step (C) at least one diluent (e) is added. In the present context, suitable diluents (e) are selected from the group consisting of alkali metal soaps of higher fatty acids, alkylaryl sulfonates such as sodium dodecyl benzene sulfonate, long chain fatty alcohol sulfates, olefin sulfates and olefin sulfonates, sulfated monoglycerides, sulfated esters, sulfonated ethoxylated alcohols, sulfosuccinates, alkane sulfonates, phosphate esters, alkyl isethionates, alkyl taurates, and alkyl sarcosinates, alkoxylated alcohols, butyldiglycol and mixtures thereof.

Preferably, the diluent (e) is selected from the group consisting of sulfated monoglycerides, sulfated esters, sulfonated ethoxylated alcohols, sulfosuccinates, alkane sulfonates, phosphate esters, alkyl isethionates, alkyl taurates, and alkyl sarcosinates, alkoxylated alcohols and butyldiglycol.

More preferably, it is selected from the group consisting of sulfosuccinates, alkane sulfonates, phosphate esters, alkyl isethionates, alkyl taurates, and alkyl sarcosinates, alkoxylated alcohols and butyldiglycol.

Most preferably, it is selected from the group consisting of alkyl taurates, and alkyl sarcosinates, alkoxylated alcohols and butyldiglycol.

Accordingly, in a preferred embodiment, the continuous process for preparing a polyurethane composition comprises the steps of:

(A) mixing
  (a) at least one polyalkylene glycol having a water content in the range of ≥0 wt.-% to ≤0.1 wt.-% by weight of the at least one poly-alkylene glycol,
  (b) at least one compound selected from the group consisting of $C_4$ to $C_{30}$ alcohols, $C_4$ to $C_{30}$ alcohol alkoxylates and $C_4$ to $C_{30}$ alkyl phenol alkoxylates,
  (c) at least one polyisocyanate, and
  (d) at least one catalyst,
  at a temperature in the range of ≥50° C. to ≤80° C. to obtain a reaction feed stream,
(B) reacting the reaction feed stream of step (A) in at least one reactor at a temperature in the range of ≥80° C. to ≤150° C. and a residence time in the range of ≥0.05 h to ≤4 h to obtain a polyurethane, and
(C) adding water and at least one diluent (e) to the polyurethane of step (B) to obtain a polyurethane composition,
characterized in that the difference between the temperature in step (B) and the temperature in step (A) is at least 10° C.

Although, suitable amounts of diluent (e) can be added in step (B). Preferably, the diluent (e) is present in an amount in the range of ≥30 wt.-% to ≤70 wt.-%, based on the total weight of the reaction feed stream. More preferably, it is in an amount in the range of 40 wt.-% to ≤70 wt.-%. Most preferably, it is in an amount in the range of ≥40 wt.-% to ≤60 wt.-%.

In another preferred embodiment, in at least one of step (A) and/or step (B) and/or step (C), independent of one another, at least one solubilizer (f) is added. In the present context, the term "solubilizer" refers to compounds which do not react with any of the reactants, as described hereinabove. In particular, solubilizers (f) are compounds which do not contain any active hydrogen. Preferably, the compound must not contain primary or secondary amines, hydroxy-groups, carboxy-groups and thiol-groups.

Suitable solubilizers (f) are selected from the group consisting of dimethylsulfoxide, sulfolan, N-methylpyrrolidone, (poly)alkyleneglycol dialkyl ethers, (poly)alkylene glycol monoalkyl ether, toluene, acetonitrile, tetrahydrofuran, butyltriglycol, propyleneglycol and mixtures thereof. Particularly preferred solubilizers include dimethylsulfoxide, sulfolan, N-methylpyrrolidone, triethylene glycol dimethyl ether, 1,2-dimethoxyethane, bis(2-methoxyethyl) ether, and 2-ethoxyethyl acetate or propylene glycol methyl ether acetate.

Accordingly, in a preferred embodiment, the continuous process for preparing a polyurethane composition comprises the steps of:

(A) mixing
  (a) at least one polyalkylene glycol having a water content in the range of $\geq 0$ wt.-% to $\leq 0.1$ wt.-% by weight of the at least one poly-alkylene glycol,
  (b) at least one compound selected from the group consisting of $C_4$ to $C_{30}$ alcohols, $C_4$ to $C_{30}$ alcohol alkoxylates and $C_4$ to $C_{30}$ alkyl phenol alkoxylates,
  (c) at least one polyisocyanate,
  (d) at least one catalyst, and
  (f) at least one solubilizer,
  at a temperature in the range of $\geq 50°$ C. to $\leq 80°$ C. to obtain a reaction feed stream,
(B) reacting the reaction feed stream of step (A) in at least one reactor at a temperature in the range of $\geq 80°$ C. to $\leq 150°$ C. and a residence time in the range of $\geq 0.05$ h to $\leq 4$ h to obtain a polyurethane, and
(C) adding water to the polyurethane of step (B) to obtain a polyurethane composition, characterized in that the difference between the temperature in step (B) and the temperature in step (A) is at least $10°$ C.

In another preferred embodiment, the continuous process for preparing a polyurethane composition comprises the steps of:

(A) mixing
  (a) at least one polyalkylene glycol having a water content in the range of $\geq 0$ wt.-% to $\leq 0.1$ wt.-% by weight of the at least one poly-alkylene glycol,
  (b) at least one compound selected from the group consisting of $C_4$ to $C_{30}$ alcohols, $C_4$ to $C_{30}$ alcohol alkoxylates and $C_4$ to $C_{30}$ alkyl phenol alkoxylates,
  (c) at least one polyisocyanate, and
  (d) at least one catalyst,
  at a temperature in the range of $\geq 50°$ C. to $\leq 80°$ C. to obtain a reaction feed stream,
(B) reacting the reaction feed stream of step (A) in the presence of at least one solubilizer (f) in at least one reactor at a temperature in the range of $\geq 80°$ C. to $\leq 150°$ C. and a residence time in the range of $\geq 0.05$ h to $\leq 4$ h to obtain a polyurethane, and
(C) adding water to the polyurethane of step (B) to obtain a polyurethane composition, characterized in that the difference between the temperature in step (B) and the temperature in step (A) is at least $10°$ C.

In yet another preferred embodiment, the continuous process for preparing a polyurethane composition comprises the steps of:

(A) mixing
  (a) at least one polyalkylene glycol having a water content in the range of $\geq 0$ wt.-% to $\leq 0.1$ wt.-% by weight of the at least one poly-alkylene glycol,
  (b) at least one compound selected from the group consisting of $C_4$ to $C_{30}$ alcohols, $C_4$ to $C_{30}$ alcohol alkoxylates and $C_4$ to $C_{30}$ alkyl phenol alkoxylates,
  (c) at least one polyisocyanate, and
  (d) at least one catalyst,
  at a temperature in the range of $\geq 50°$ C. to $\leq 80°$ C. to obtain a reaction feed stream,
(B) reacting the reaction feed stream of step (A) in at least one reactor at a temperature in the range of $\geq 80°$ C. to $\leq 150°$ C. and a residence time in the range of $\geq 0.05$ h to $\leq 4$ h to obtain a polyurethane, and
(C) adding water and at least one solubilizer (f) to the polyurethane of step (B) to obtain a polyurethane composition,
characterized in that the difference between the temperature in step (B) and the temperature in step (A) is at least $10°$ C.

Although, suitable amounts of solubilizer (f) can be added in step (B). Preferably, the solubilizer (f) is present in an amount in the range of $\geq 0$ wt.-% to $\leq 30$ wt.-% based on the total weight of the reaction feed stream. More preferably, it is in an amount in the range of $\geq 0$ wt.-% to $\leq 10$ wt.-%. Most preferably, it is in an amount in the range of $\geq 0$ wt.-% to $\leq 5$ wt.-%.

In another preferred embodiment, the solubilizer is pre-heated. In an embodiment, the solubilizer is pre-heated to a temperature in the range of $\geq 50°$ C. to $\leq 140°$ C., preferably in the range of $\geq 50°$ C. to $\leq 120°$ C., or $\geq 50°$ C. to $100°$ C., or $\geq 70°$ C. to $\leq 90°$ C.

The reaction feed stream obtained in the mixing step is subjected to step (B) of the process described hereinabove. The step (B) is hereinafter interchangeably referred to as the reaction step. The reaction feed stream obtained in step (A) or the mixing step, as described hereinabove, is reacted in at least one reactor at a temperature in the range of $\geq 80°$ C. to $\leq 150°$ C. and a residence time in the range of $\geq 0.05$ h to $\leq 4$ h to obtain a polyurethane. The polyurethane, as obtained in step (B), has a viscosity preferably in the range of $\geq 1$ Pa·s to $\leq 5000$ Pa·s.

For the purpose of the present invention, any suitable reactor may be employed for carrying out reaction in the reaction feed stream in the reaction step, as described hereinabove. Particularly preferably, the at least one reactor is a static mixer.

As is known in the art, a static mixer is a precision engineered multiphase mixing device for the continuous mixing of fluid materials. Unlike dynamic mixing devices or dynamic mixers, which are marked by the presence of an external force for agitating the fluids to be mixed, the static mixing devices or static mixers provide adequate mixing through their flow geometry. Typical examples of a dynamic mixer include, such as but not limited to, a stirred tank vessel. While the dynamic mixers more often create non-uniform mixing and turbulent zones inside the reactor, the static mixers are advantageous for highly viscous fluids and provide uniform mixing. The static mixers offer mixing in the laminar regime due to the high viscosity of the fluid, thereby also resulting in a uniform heat dissipation. Moreover, the static mixers utilize the kinetic energy of the fluid itself for mixing. Thus, concentration equalization is achieved solely by the flow through the mixer in the case of static mixers. High-maintenance movable parts are therefore dispensed with. In virtually all the cases, there is a specific channel geometry which is often provided with internals. Static mixers operate largely according to the principle of lamination, chaotic advection or production of turbulent eddy detachments.

Although, the static mixer may exist in any shape, size and/or dimension, preference is given to the one having a tubular flow duct which has a longitudinal axis and an inner diameter, having a mixing element which is arranged in the flow duct and which has a length and a diameter substantially corresponding to the inner diameter of the flow duct. By the term "length", it is referred to the dimension in the longitudinal direction of the static mixer. The term "mixing element", refers to the means for mixing the fluid inside the static mixer. The mixing element plays an important role in deciding the flow pattern, thereby rendering it being the most essential component of the static mixer. The flow pattern, in turn, decides the flow regime of the fluid being mixed inside the static mixer. By the term "flow regime", it is referred to laminar flow and turbulent flow of the fluid inside the static mixer. The flow regime is decided by a dimensionless number, called the Reynolds number (Re). The Reynolds number is the ratio of inertial resistance to viscous resistance for a flowing fluid and is well known to the person skilled in the art.

All the commercially available static mixers aim at achieving not only better mass transfer but also thermal homogenization. More often, mixers, heat exchangers and reactors having relatively high throughputs are combined in one apparatus. As a result of the uniform mixing, the heat energy liberated by a reaction can be efficiently removed or in the case of an endothermic reaction supplied. The advantages are frequently the smaller distance between heat source or heat sink and the larger heat transfer area compared to apparatuses such as a dynamic mixer. At the same time, greater heat transfer can be achieved in the processing of viscous fluids with laminar flows since radial mass transfer is increased by the selected geometry. The radial heat transport is based not only on heat conduction as in the case of a laminar flow tube, but is increased by a convective contribution. At the same time, better ratios of heat transfer area to reaction volume are frequently achieved, but this is associated with higher manufacturing costs. This larger area leads at the same time to greater problems with fouling in reaction systems. The internals make cleaning considerably more complicated than in the case of tubes without internals. However, narrower temperature distributions and better-controlled reaction conditions can be achieved overall.

For the purpose of the present invention, any suitable static mixer known to the person skilled in the art can be employed. One such static mixer is described in US 2011/0080801 A1. The static mixer described therein is an optimized static mixer based on x-mixer design. Each mixing elements have a multiplicity of webs which are spaced and designed with varying size. Another static mixing element and a static mixing apparatus comprising the same is described in US 2010/202248 A1. The said mixing elements are installed in a hollow body and comprise a plurality of arrangements placed at different angles and spaces with lower pressure losses with comparable or improved mixing efficiency. Static mixing devices and/or mixing elements are further also described in U.S. Pat. Nos. 4,201,482 A, 5,620, 252 A, 4,692,030 A, 3,286,992 A and 3,664,638 A.

Accordingly, it is important that the static mixer employed as the at least one reactor in the present invention is capable of providing uniform heat and mass distribution with low pressure drop. Preferably, the static mixer of the present invention is similar to the one described in EP 1 067 352 B1. The static mixer is of dual functionality, i.e. it provides for uniform mass distribution as well as heat exchange. This not only makes the overall process cost effective, but also provides easy handling of highly viscous polyurethane composition resulting therefrom.

In a particularly preferable embodiment, the static mixer comprises a plurality of mixing elements. Each of the said plurality of mixing elements comprises a plurality of webs alternatively inclined towards each other. The said plurality of webs together forms a mixing element and are disposed on an inner surface of the said static mixer. The term "inner surface" refers to the interior surface of the tubular flow duct, as described hereinabove, in which the reaction feed stream flows. In the direction of the flow of the reaction feed stream, the plurality of webs is disposed obliquely. That is, to say, that the plurality of webs is neither placed perpendicular nor in the direction of the flow of the reaction feed stream. Such arrangement of the plurality of webs prevents the formation of eddies due to flow separation of the reaction feed stream in and around the boundary of the plurality of webs, which is present if the plurality of webs is arranged perpendicularly to the flow of the reaction feed stream. On the other hand, when the plurality of webs is disposed in the direction of the reaction feed stream, there is very less mixing or in fact no mixing.

Additionally, the oblique positioning of the plurality of webs divides the reaction feed stream which flows in elongated form. Along a web, the reaction feed stream is divided by the oppositely positioned webs and is divided further throughout the length of the tubular flow duct. This results in low flow velocity of the reaction feed stream, thereby resulting in a laminar flow. Moreover, the unique arrangement of the plurality of webs inside the tubular flow duct further ensures the uniform heat distribution in the reaction step. Accordingly, the static mixer as the at least one reactor in the reaction step performs dual functionality and is therefore interchangeably also referred as a mixer heat exchanger.

The mixing of reaction feed stream initiated by the static mixer, as described hereinabove, proceeds via the process of lamination. Since lamination functions even in the case of laminar flows, the static mixer can be used for mixing viscous fluids without a high flow velocity, as in the present invention. Moreover, a tubular flow duct equipped with the plurality of mixing elements displays a narrower residence time distribution compared to an empty tube. The level of mixing attained by the static mixer is dependent on several parameters, such as but not limited to, diameter of the flow duct, throughput of various reactants, number of mixing elements and arrangement of the plurality of webs. For instance, with a greater number of webs, more rapid mixing is possible, but the pressure drop increases. Moreover, when diameter of the tubular flow duct is increased, a reduction in the ratio of heat transfer area to reaction volume is expected. In order to achieve complete mixing, these parameters need to be optimized.

Owing to the various advantages associated with the static mixer, the mixing step i.e. step (A), in an embodiment, is carried out in the presence of the static mixer. That is, to say, that the mixer for carrying out mixing in the mixing step is a static mixer. Thus, in a preferred embodiment, the continuous process for preparing the polyurethane composition comprises the steps of:

(A) mixing
   (a) at least one polyalkylene glycol having a water content in the range of $\geq 0$ wt.-% to $\leq 0.1$ wt.-% by weight of the at least one polyalkylene glycol, (b) at least one compound selected from the group consisting of $C_4$ to $C_{30}$ alcohols, $C_4$ to $C_{30}$ alcohol alkoxylates and $C_4$ to $C_{30}$ alkyl phenol alkoxylates, (c) at least one polyisocyanate, and (d) at least one catalyst, at a temperature in the range of ≥50° C. to ≤80° C. to obtain a reaction feed stream, (B) reacting the reaction feed stream of step (A) in at least one reactor at a temperature in the range of ≥80° C. to ≤150° C. and a residence time in the range of ≥0.05 h to ≤4 h to obtain a polyurethane, and (C) adding water to the polyurethane of step (B) to obtain a polyurethane composition, characterized in that the difference between the temperature in step (B) and the temperature in step (A) is at least 10° C., and wherein step (A) and step (B), independent of one another, is carried out in the static mixer.

As is known to the person skilled in the art, the static mixer, as described hereinabove or hereinbelow, is governed by several parameters which need to be closely monitored or optimized to achieve the desired level of mixing and the product resulting therefrom. The important parameters that need to be monitored are, such as but not limited to, heat transfer rate, shear rate, residence time and temperature during the reaction step.

In the reaction step, a temperature in the range of ≥80° C. to ≤150° C. is maintained. Preferably, it is in the range of ≥80° C. to ≤145° C., or ≥82° C. to ≤145° C., or ≥85° C. to ≤140° C., or ≥85° C. to ≤135° C. More preferably, it is in the range of ≥87° C. to ≤130° C., or ≥90° C. to ≤125° C., or ≥90° C. to ≤120° C., or ≥95° C. to ≤120° C. Most preferably, it is in the range of ≥95° C. to ≤115° C.

Typical residence time prevailing in the at least one reactor is in the range of ≥0.05 h to ≤4 h to obtain the polyurethane by the reaction of the reactants in the reaction feed stream. As is known to the person skilled in the art, "residence time" refers to the amount of time a fluid element spends inside a reactor. The person skilled in the art is well aware of the techniques to measure the residence time.

An advantage of determining the residence time using any of the suitable techniques is that an approximation of the reactor volume can be made. The approximate reactor volume determined thereby can be used to further determine whether a single reactor is sufficient, or more than one reactors need to be used. Accordingly, in a preferred embodiment, more than one reactors may also be employed. That is, to say, more than one static mixers, as described hereinabove, may be employed. For instance, 2, 3, 4, 5 or more static mixers may be combined in series to obtain the polyurethane as a reaction product of the reactants, as described hereinabove, in the reaction feed stream. Such a choice of the number of reactors is known to the person skilled in the art and therefore, the present invention is not limited by the same.

Preferably, the residence time provided is in the range of ≥0.05 h to ≤4 h, or ≥0.05 h to ≤3 h, or ≥0.05 h to ≤2 h. More preferably, it is in the range of ≥0.08 h to ≤2 h, or ≥0.15 h to ≤2 h, or ≥0.25 h to ≤2 h. Most preferably, it is in the range of ≥0.3 h to ≤1.5 h, or ≥0.4 h to ≤1.25 h, or 0.5 h to ≤1 h.

Another important parameter is the heat transfer rate of the static mixer, as described hereinabove. Typically, the static mixer has a heat transfer rate in the range of ≥10 kW/K·m³ to ≤250 kW/K·m³. The static mixer as used in the present invention is notable for their high heat transfer capacity, as characterized by the specific heat transfer rate in W/K·m³, in other words, heat transfer per kelvin of temperature difference with respect to the heat transfer medium, based on the free volume of the static mixer. These high heat transfer rates have the effect in particular of minimizing temperature differences between the reactor contents and the cooling medium, allowing very narrow temperature control, which is beneficial to the stability of the process and also in respect of the potential formation of deposits on the surfaces. Preferably, the static mixer has a heat transfer rate in the range of ≥10 kW/K·m³ to ≤250 kW/K·m³, or ≥10 kW/K·m³ to ≤225 kW/K·m³, or ≥10 kW/K·m³ to ≤220 kW/K·m³, or ≥15 kW/K·m³ to ≤200 kW/K·m³. More preferably, it is in the range of ≥15 kW/K·m³ to ≤175 kW/K·m³, or ≥15 kW/K·m³ to ≤170 kW/K·m³, or ≥20 kW/K·m³ to ≤165 kW/K·m³, or ≥20 kW/K·m³ to ≤160 kW/K·m³. Most preferably, it is in the range of ≥20 kW/K·m³ to ≤155 kW/K·m³, or ≥20 kW/K·m³ to ≤150 kW/K·m³, or ≥25 kW/K·m³ to ≤150 kW/K·m³, or ≥30 kW/K·m³ to ≤150 kW/K·m³. In an embodiment, the heat transfer rate is in the range of ≥35 kW/K·m³ to ≤150 kW/K·m³.

In order for flow inside the tubular flow duct in the static mixer to occur, there should be a sufficient pressure difference across the duct. However, the pressure drop across the duct should be minimum or else the overall productivity is compromised. Accordingly, the pressure drop in the static mixer is in the range of ≥0.05 MPa to ≤20 MPa. Preferably, it is in the range of ≥0.1 MPa to ≤10 MPa. More preferably, it is in the range of ≥0.2 MPa to ≤6 MPa. Most preferably, it is in the range of ≥0.5 MPa to ≤2 MPa. Said pressure drop can be measured using any suitable technique known to the person skilled in the art. For instance, it is measured as the difference of the pressure determined at the inlet of the static mixer and the outlet of the static mixer. The skilled person can easily determine the configuration and set up of the static mixer, e.g. length and diameter of the mixing elements, to achieve the desired pressure drop.

The polyurethane, as obtained in the reaction step, has a viscosity preferably in the range of ≥1 Pa·s to ≤5000 Pa·s. As is evident, a wide range of viscosity polyurethane can be obtained in the present invention. It is known to the person skilled in the art that the viscosity of the polyurethane product in the reaction step can be varied by varying the reactants in the reaction feed stream. For instance, varying the at least one polyalkylene glycol (a) and/or the at least one compound selected from the group consisting of $C_4$ to $C_{30}$ alcohols, $C_4$ to $C_{30}$ alcohol alkoxylates and $C_4$ to $C_{30}$ alkyl phenol alkoxylates can result in a wide viscosity range of the polyurethane product.

Although, a wide viscosity range of polyurethane is obtainable from the present invention, preferably, the viscosity is in the range of ≥1 Pa·s to ≤5000 Pa·s, or ≥1 Pa·s to ≤2500 Pa·s, or ≥1 Pa·s to ≤1000 Pa·s. More preferably, the viscosity is in the range of ≥2 Pa·s to ≤1000 Pa·s, or ≥5 Pa·s to ≤1000 Pa·s, or ≥10 Pa·s to ≤1000 Pa·s. Most preferably, the viscosity is in the range of ≥15 Pa·s to ≤700 Pa·s, or ≥20 Pa·s to ≤500 Pa·s, or ≥25 Pa·s to ≤400 Pa·s, or ≥50 Pa·s to ≤200 Pa·s.

In a preferred embodiment, the difference between the temperature in step (B) and the temperature in step (A), as described hereinabove, is preferably maintained at least 10° C. Particularly preferably, the difference is in the range of ≥10° C. to ≤50° C.

Water is now added to the polyurethane of step (B) or the reaction step, as described hereinabove to obtain the polyurethane composition in step (C). The step (C) is interchangeably also referred as the addition step. In an embodiment, the water is pre-heated to a temperature in the range of ≥50° C. to ≤140° C., preferably in the range of ≥50° C. to ≤120° C., or ≥50° C. to ≤100° C., or ≥70° C. to ≤90° C.

Suitable techniques can be employed to heat the water for the purpose of step (C) of the present invention.

The purpose of adding water to the polyurethane of step (B) is to prevent the highly viscous polyurethane from getting solidified. For this purpose, a direct contact between water and polyurethane is established in the step (C) to obtain the polyurethane composition having a viscosity in the range of ≥0.5 Pa·s to ≤100 Pa·s determined according to DIN EN ISO 3219 at a temperature of 23° C.±0.2° C. and a shear rate of 1 $s^{-1}$.

For the purpose of the present invention, water and optionally the at least one solubilizer (f) can be added in any sequence and manner. For instance, they may be added dropwise or all at once to the polyurethane of step (B).

The amount of water added to the polyurethane of step (B) depends on the final viscosity of the polyurethane composition desired. It is known to the person skilled in the art to estimate the amount of pre-heated water based on the desired viscosity of the polyurethane composition. The polyurethane composition obtained in step (C) has a viscosity in the range of ≥0.5 Pa·s to ≤100 Pa·s determined according to DIN EN ISO 3219 at a temperature of 23° C.±0.2° C. and a shear rate of 1 $s^{-1}$. Preferably, it is in the range of ≥0.5 Pa·s to ≤90 Pa·s, or ≥0.5 Pa·s to ≤80 Pa·s. More preferably, it is in the range of ≥0.5 Pa·s to ≤70 Pa·s, or ≥0.5 Pa·s to ≤60 Pa·s, or ≥0.5 Pa·s to ≤50 Pa·s, or ≥0.5 Pa·s to ≤40 Pa·s. Most preferably, in the range of ≥0.5 Pa·s to ≤30 Pa·s, or ≥0.5 Pa·s to ≤20 Pa·s, or ≥0.5 Pa·s to ≤10 Pa·s. The viscosity is in each case determined according to DIN EN ISO 3219 at a temperature of 23° C.±0.2° C. and a shear rate of 1 $s^{-1}$.

Any suitable equipment or container may be employed for adding the pre-heated water to the polyurethane of step (B). Such equipment or container are known to the person skilled in the art. However, in an embodiment the addition of pre-heated water to the polyurethane of step (C) takes place in the static mixer, as described hereinabove. The static mixer is advantageous in terms of providing uniform heat and mass distribution during the addition step.

In a preferred embodiment, the present invention further comprises the step of:
(D) cooling the polyurethane composition obtained in step (C) at a temperature in the range of ≥30° C. to ≤70° C.

Interchangeably, the step (D) may also be referred to as the cooling step. The step (D), as described hereinabove, is an optional step. Any suitable equipment or container may be employed for cooling the polyurethane composition of step (C). Such equipment or container are known to the person skilled in the art. However, in an embodiment the cooling of polyurethane composition in step (D) takes place in the static mixer, as described hereinabove.

Accordingly, in another preferred embodiment the continuous process for preparing the polyurethane composition comprises the steps of:
(A) mixing
  (a) at least one polyalkylene glycol having a water content in the range of ≥0 wt.-% to ≤0.1 wt.-% by weight of the at least one polyalkylene glycol,
  (b) at least one compound selected from the group consisting of $C_4$ to $C_{30}$ alcohols, $C_4$ to $C_{30}$ alcohol alkoxylates and $C_4$ to $C_{30}$ alkyl phenol alkoxylates,
  (c) at least one polyisocyanate, and
  (d) at least one catalyst,
at a temperature in the range of ≥50° C. to ≤80° C. to obtain a reaction feed stream,
(B) reacting the reaction feed stream of step (A) in at least one reactor at a temperature in the range of ≥80° C. to ≤150° C. and a residence time in the range of ≥0.05 h to ≤4 h to obtain a polyurethane,
(C) adding water to the polyurethane of step (B) to obtain a polyurethane composition, and
(D) cooling the polyurethane composition of step (C) at a temperature in the range of ≥30° C. to ≤70° C.,
characterized in that the difference between the temperature in step (B) and the temperature in step (A) is at least 10° C.

In another preferred embodiment, the following temporal sequence of steps applies (A)→(B)→(C) to obtain the polyurethane composition. Alternatively, the following temporal sequence of steps applies (A)→(B)→(C)→(D) to obtain the polyurethane composition.

Another aspect of the present describes a polyurethane composition obtained by the process as described hereinabove. The polyurethane composition has a viscosity preferably in the range of ≥0.5 Pa·s to ≤100 Pa·s according to DIN EN ISO 3219 at a temperature of 23° C.±0.2° C. and a shear rate of 1 $s^{-1}$.

In a preferred embodiment, the polyurethane composition comprises polyurethane in the range of ≥1 wt.-% to ≤50 wt.-%, preferably in the range of ≥5 wt.-% to ≤45 wt.-% or in the range of ≥10 wt.-% to ≤40 wt.-%, more preferably in the range of ≥15 wt.-% to ≤35 wt.-%, and most preferably in the range of ≥15 wt.-% to ≤30 wt.-%; and water in the range of 25 z wt.-% to ≤90 wt.-% based upon the total weight of the composition.

In another preferred embodiment, the polyurethane composition further comprises oligosaccharides, biocides and complexing agents.

Preferred complexing agents are selected from the group consisting of citric acid or a salt thereof, gluconic acid or a salt thereof, or a salt of ethylenediamine tetra acetic acid (EDTA salt).

Yet another aspect of the present invention describes the use of the polyurethane composition as described hereinabove as rheology modifier.

Still another aspect of the present invention describes a formulation comprising:
(a) ≥0.01 wt.-% to ≤10 wt.-% of the polyurethane composition as described hereinabove, and
(b) ≥15 wt.-% to ≤99 wt.-% of at least one of the components, selected from the group consisting of pigments, fillers, binders, defoamers, neutralising agent, wetting agent, pigment dispersing agents, and water.

The components, such as pigments, fillers, binders, defoamers, neutralising agent, wetting agent and pigment dispersing agents, can be found in any suitable textbook or handbook. For instance, "Handbook of Coating additives", $2^{nd}$ Edition by John J. Florio and Daniel J. Miller pp 549 ff. ISBN 0-8247-5626-6 can be referred for this purpose.

Suitable fillers are, for example, organic or inorganic particulate materials such as, for example, calcium carbonates and silicates, and also inorganic fiber materials such as glass fibers, for example. Organic fillers as well, such as carbon fibers, and mixtures of organic and inorganic fillers, such as mixtures of glass fibers and carbon fibers or mixtures of carbon fibers and inorganic fillers, for example, may find application.

Suitable binders are the ones customarily used, for example the ones described in 30 Ullmann's Encyclopedia of Industrial Chemistry, 5th Edition, Vol. A18, pp. 368-426, VCH, Weinheim 1991, Germany. In general, the film-forming binder is based on a thermoplastic or thermosetting resin. Examples thereof are alkyd, acrylic, unsaturated or saturated polyester resin, acrylate and methacrylate resins, nitrocellulose, cellulose acetobutyrate, alkyd-amino resins, alkyd resins, melamine resins, urea resins, silicone resins, phenolic, melamine, epoxy and polyurethane resins and mixtures thereof. Also resins curable by radiation or air-drying 35 resins can be used. Binders may also be derived from polyvinylalcohol and polyvinylbutyral. Binders include latex polymers made by emulsion polymerization. For architectural coatings especially, preferred latex polymers are based on acrylic emulsion polymers, styrene-acrylic emulsion polymers, vinyl acetate-acrylic emulsion polymers or emulsion polymers based on ethylene and vinyl acetate.

Organic or inorganic pigments are suitable as additives. Examples of organic pigments are color pigments and mother-of-pearl-like pigments such as azo, disazo, naphthol, benzimidazolone, azo condensation, metal complex, isoindolinone, quinophthalone, and dioxazine pigments, polycyclic pigments such as indigo, thioindigo, quinacridones, phthalocyanines, perylenes, perinones, anthraquinones, e.g., aminoanthraquinones or hydroxyanthraquinones, anthrapyrimidines, indanthrones, flavanthrones, pyranthrones, anthanthrones, isoviolanthrones, diketopyrrolopyrroles, and also carbazoles, e.g., carbazole violet, and the like. Other examples of organic pigments can be found in the following monograph: W. Herbst, K. Hunger, "Industrielle Organische Pigmente", $2^{nd}$ edition, 1995, VCH Verlagsgesellschaft, ISBN: 3-527-28744-2. Examples of inorganic pigments are titanium dioxide, metallic flakes, such as aluminum and also aluminum oxide, iron (III) oxide, chromium (III) oxide, titanium (IV) oxide, zirconium(IV)oxide, zinc oxide, zinc sulfide, zinc phosphate, mixed metal oxide phosphates, molybdenum sulfide, cadmium sulfide, graphite, vanadates such as bismuth vanadate, chromates, such as lead(IV) chromates, molybdates such as lead(IV) molybdate, and mixtures thereof.

Suitable neutralizing agents are inorganic bases, organic bases, and combinations thereof. Examples of inorganic bases include but are not limited to the alkali metal hydroxides (especially lithium, sodium, potassium, magnesium, and ammonium), and alkali metal salts of inorganic acids, such as sodium borate (borax), sodium phosphate, sodium pyrophosphate, and the like; and mixtures thereof. Examples of organic bases include but are not limited to triethanolamine (TEA), diisopropanolamine, triisopropanolamine, aminomethyl propanol (2-Amino-2-methyl-1-propanol), dodecylamine, cocamine, oleamine, morpholine, triamylamine, triethylamine, tetrakis(hydroxypropyl)ethylenediamine, L-arginine, methyl glutamine, isopropylamine, aminomethyl propanol, tromethamine (2-amino 2-hydroxymethyl-1,3-propanediol), and PEG-15 cocamine. Alternatively, other alkaline materials can be used alone or in combination with the above-mentioned inorganic and organic bases.

Suitable wetting agents include silicone surface additives such as polysiloxanes including polyether modified poly-dimethyl-polysiloxane, polyester modified poly-dimethyl-siloxane; fluorosurfactants such as Zonyl™ fluorosurfactants (Zonyl is a trademark of E. I. du Pont de Nemours and Co.); surfactants based on acetylenic alcohol, diol, and glycol chemistry such as Surfynol™ 61 surfactant and Dynol™ 604 surfactant (Surfynol and Dynol are trademarks of Air Products and Chemicals, Inc.) Hydropalat® WE324 and mixtures thereof.

Suitable defoamers are selected from the wide range of defoamer used such as silicone based defoamers, emulsion defoamers, star polymer based defoamers, powder defoamers, oil based defoamers.

For the purpose of the present invention, the formulation as described hereinabove, is, such as but not limited to, a paint, lacquer, varnish, paper coating, wood coating, adhesive, cosmetic formulation, detergent formulation, textile and drilling muds plaster formulations, formulations for plasterboard, for hydraulic binders such as mortar formulations, formulations for ceramics and for leather. The wide range of viscosity of the polyurethane composition, as described hereinabove, allows it to be used for numerous applications.

Another aspect of the present invention describes a use of the formulation described hereinabove as a thickener for water-borne coating formulations for achieving good thickening efficiency and a non-Newtonian rheology profile of the formulations.

Advantages

The process according to the presently claimed invention offers one or more of the following advantages:

The presently claimed process provides a polyurethane composition which offers non-Newtonian rheology profile upon addition to water-borne coating formulations.

Polyurethane composition having a viscosity in the range of ≥0.5 Pa·s to ≤100 Pa·s is obtained from the process of the present invention.

Use of the organic solvents is reduced or even avoided thereby reducing the stream of organic materials to be separated off after the reaction to a considerable extent. In addition, the costs for a work-up and for the disposal of the organic solvents such as toluene is saved.

Being a continuous process, the process can be regulated efficiently, and a constant quality of products can be ensured such that there are no fluctuations between individual batches.

Significant reduction of residence time and therefore reduction of thermal stress, thereby improving product quality.

Having generally described the invention, a further understanding can be obtained by reference to certain specific examples which are provided herein for the purpose of illustration only and are not intended to be limiting unless otherwise specified.

EXAMPLES

Compounds

Pluriol® E 8000 E, polyethylene glycol (CAS No. 25322683);

Hydropalat® WE3240, based on silicone oil, modified organic solvent;

FoamStar® S12210, modified polydimethyl siloxane used as defoamer in water-based coating systems;

Dispex® CX 4320, sodium salt of a carboxylic acid copolymer in water used as a wetting and dispersing agent for inorganic fillers and pigments;

Solvenon® DPM (CAS No. 34590-94-8), dipropylenglycol methylether; and

Acronal® DS6277, an anionic hydrophobic straight acrylic binder, are available from BASF SE, Ludwigshafen, Germany.

Desmodur© W, H12MDI, 4,4'-dicyclohexyl methane diisocyanate;

is available from Covestro AG, Leverkusen, Germany.

Kronos® 2190, titanium dioxide, is available from Kronos®.

Finntalc® M15, Talc (Mg-Silicate) is available from Mondo Minerals B.V.

K-Kat 348, a bismuth carboxylate catalyst is available from King Industries, USA.
Hexanol;
Ammonia;
Butyldiglycol, and
DBU {1, 8-diazabicylco(5,4,0) undec-7-ene}, are available from Sigma Aldrich.

Apparatus

Reactors, Mixer, Thermostats

A five reactor (R1-R5) and mixer module (R'1-R'2) from Fluitec International, USA is employed in the representative examples of the present invention. These are 5 double-wall tube reactors having different volumes which are connected in series and in the interior of which static mixers are present. Fluitec CSE-X⁻ static mixers are used in the invention. The first reactor (R1) is configured so that, with its narrower diameter and mixing elements having 8 webs, good mixing and heating of the reaction mixture is ensured. The second reactor (R2), on the other hand, provides a longer residence time for the reaction with a lower pressure drop due to elements having fewer webs. The third reactor (R3) is configured in a manner analogous to R1 since introduction upstream of this reactor is possible. On the other hand, the fourth reactor (R4) and the fifth reactor (R5) offer good residence time for the reaction. The precise properties of the individual reactors are provided in Table 1.

TABLE 1

| Properties | R' (R'1-R'2) | R1 | R2 | R3 | R4 | R5 |
|---|---|---|---|---|---|---|
| Diameter (in mm) | 8.0 | 12.3 | 21.0 | 12.3 | 21.0 | 21.0 |
| Volume (in ml) | 8 | 45 | 130 | 45 | 130 | 130 |
| Temperature (max.) in ° C. | 90 | 90 | 90 | 110 | 120 | 120 |
| Mixer type | CSE- X/6 | CSE- X/8 | CSE- X/4 | CSE- X/8 | CSE- X/4 | CSE- X/4 |

The temperature of the reactors is regulated via four thermostats (W1-W4) of the type HT30 from Julabo, USA. The temperature in the last two reactors (R4 and R5) is regulated by means of a thermostat (W4).

Another static mixer of the same type (R') integrated vertically into the feed conduit is located upstream of the horizontal reactors (R1-R5).

Methods

Measurement of Viscosity

The reported viscosities are obtained by a rheometer at a temperature of 23° C.±0.2° C. and a shear rate of 1 s⁻¹ according to a method in dependence to DIN EN ISO 3219.

Measurement of Molecular Weight $M_w$

Molecular weight of the polyurethane and the polyurethane composition prepared by the process of the presently claimed invention are determined according to DIN 55672-1.

Measurement of Water Content During PEG Drying

Confirmation of water content during PEG drying is done through Karl Fischer titration Measurement of NCO Content Polyurethane resin (1 g to 2 g) is reacted with 5 ml of a 0.1 M dibutylamine solution in toluene and dissolved in 70 ml acetone upon gentle heating at ~50° C. The resulting solution is titrated with 0.1 M HCl with coulemetric endpoint detection.

Example 1

Preparation of Polyurethane Composition without Diluent 6 kg of PEG 8000 is introduced stepwise into the preheated reaction vessel. The heating mantle temperature is set to 110° C. The stirrer is set to a value of from 20 to 30 revolutions per minute (rpm). After the PEG 8000 has all melted, a nitrogen stream of 600 l/h is blown in for at least 24 hours until water content is below 200 ppm. The container is maintained at 100° C. and the nitrogen stream is limited to 400 l/h.

The feed conduits, the stirring autoclave (R100), the static premixer R', the reactors (R1-R5) and the discharge facility are firstly preheated for at least 1 hour. The properties of the static pre-mixer R', and the reactors (R1-R5) have been shown in table 1 above.

The feed conduits for the hexanol/DBU mixture and the H12MDI are partly co-heated. This brings about slight preheating of the materials before they come into contact with the PEG 8000 and thus prevent solidification of the melt and blockages.

The stirrer of the stirring autoclave (R100) is subsequently switched on with a speed of rotation in the range from 800 to 1500 rpm. The stirring autoclave (R100), the static premixer R' and the conduits in which PEG 8000 is present are heated by electric heating tapes which are regulated via the temperature at a representative position.

First PEG 8000 and Hexanol/DBU mixture are fed into the system for 20 minutes at the given flow rates, then H12MDI feed starts. The residence time is 34 minutes.

The amount (in wt.-%) of compounds used for the preparation of the polyurethane polymer have been provided in table 1.

TABLE 1

| S. No. | Compound | Amount (wt.-%) |
|---|---|---|
| 1. | PEG | 94.3 |
| 2. | Isocyanate (H12 MDI) | 3.8 |
| 3. | Alcohol (Hexanol) | 1.8 |
| 4. | Catalyst | 0.04 |
| 5. | Solubilizer | 0 |

The polyurethane polymer obtained is taken for analysis and measurement of viscosity.

The viscosity of the polyurethane is found to be 200 Pa·s at a temperature of 100° C.

Thereafter, water is added to the polyurethane obtained and a polyurethane composition having a viscosity of 2.020 Pa·s determined according to DIN EN ISO 3219 at a temperature of 23±0.2° C. and a shear rate of 1 s⁻¹ is obtained.

The polyurethane composition comprises total polymer (20.4 wt.-%) and water (79.6 wt.-%).

Table 2 provides the mass flow for the compounds used for the process of the present invention.

TABLE 2

| Example 1 | | | |
|---|---|---|---|
| Continuous drying | Residual H2O content of PEG8000 (in ppm) | | 77 |
| Step A | Mass flow (in g/h) | PEG8000 | 800 |
| | | H12MDI | 32.4 |
| | | Hexanol | 15.35 |
| | | DBU | 0.35 |
| | Temperature (in ° C.) | R'1 | 75 |
| | | R'2 | 75 |
| Step B | Temperature (in ° C.) | R1 | 90 |
| | | R2 | 90 |
| | | R3 | 110 |
| | | R4 | 110 |
| | | R5 | 110 |
| | Pressure (in bar) | Before R'1 | 20.7 |
| | | After R5 | 8.5 |
| Step C | Mass flow (in g/h) | Water - 1st | 900 |
| | | Water - 2nd | 2400 |
| | Viscosity of PU composition at 23° C. according to DIN EN ISO 3219 (Pa · s) | | 2.020 |

Comparative Example 1

Process for Manufacturing of Polyurethane in a Solvent Batch Process

Pluriol® E 8000 E (Polyethylene Glycol 8000, 200 g, 22 mmol) was dissolved in toluene (420 g) and dried via azeotropic distillation at 110° C. until water content <200 ppm as confirmed by Karl Fischer Titration. The mixture was cooled to 90° C. und under dry nitrogen atmosphere hexanol (3.68 g 34 mmol), K-Kat 348 (0.1 g) and Desmodur© W (H12MDI, 8.41 g, 30.92 mmol) were added. The mixture was stirred until residual NCO content <0.01, then cooled to 80° C. and 50 g water were added. Upon heating to 90° C. the azeotropic distillation starts. Water (800 g) is continuously added while toluene is removed until residual toluene content is below 100 ppm. Finally, solids are adjusted to 20 wt.-% by adding the remaining portion of water.

Preparation of Paint Formulation Based on Acronal® DS6277

In a representative example, first a masterbatch is prepared by mixing the compounds provided in table 3 in the given order using a dissolver and intense stirring. Kronos® 2190 is added stepwise followed by intense stirring for 10 minutes (2000 rpm to 3000 rpm).

TABLE 3

| Order of addition | Compound | Ratio |
|---|---|---|
| 1 | Water | 200 |
| 2 | Ammonia | 1 |
| 3 | Hydropalat ® WE3240 | 1 |
| 4 | FoamStar ® Si2210 | 3 |
| 5 | Dispex ® CX 4320 | 6 |
| 6 | Solvenon ® DPM | 20 |
| 7 | Kronos ® 2190 | 220 |
| 8 | Finntalc ® M15 | 50 |
| 9 | Acronal ® DS6277 | 475 |
| 10 | FoamStar ® SI 2210 | 4 |

The master batch is split into several samples and the polyurethane composition according to the present invention (additive/thickener) is incorporated into it as provided in table 4, for 10 minutes at 2000 rpm to 3000 rpm using a dissolver, to obtain the paint formulation.

TABLE 4

| Compound | Ratio |
|---|---|
| Master batch based on Acronal ® DS6277 | 98.0 |
| Additive/thickener | 2.0 |

Viscosities for paint formulations comprising the polyurethane composition prepared by a solvent batch process of the prior art (comparative example 1) and polyurethane composition (additive/thickener) obtained by the continuous process of the present invention are calculated at different shear rates and results are provided in table 5.

TABLE 5

| Example No. | Viscosity (in Pa · s) at a shear rate of $1\ s^{-1}$ | Viscosity (in Pa · s) at a shear rate of $10\ s^{-1}$ | Viscosity (in Pa · s) at a shear rate of $100\ s^{-1}$ | Viscosity (in Pa · s) at a shear rate of $1000\ s^{-1}$ | Viscosity (in Pa · s) at a shear rate of $10000\ s^{-1}$ |
|---|---|---|---|---|---|
| Comparative example 1 (solvent batch process) | 5.688 | 3.314 | 1.731 | 0.670 | 0.164 |
| Example 1 (continuous solvent free process of the present invention) | 5.811 | 3.282 | 1.711 | 0.669 | 0.164 |

The results provided in table 5 clearly demonstrate that the paint formulation prepared by incorporating the polyurethane composition (additive/thickener) obtained by the process of the present invention exhibits a non-Newtonian rheology profile i.e. the viscosity decreases with increase in the shear rate. Further, the viscosities of the paint formulation comprising the polyurethane composition (additive/thickener) at different shear rates are found comparable to the paint formulation which comprises the polyurethane composition prepared according to a solvent batch process. Thus, the process of the present invention provides a polyurethane composition (additive/thickener) which not only offers a non-Newtonian rheology profile upon addition to paint formulation but is also able to overcome the disadvantages associated with the use of a solvent batch process such as difficulties in regulating the process and quality of product, high VOC etc.

Example 2

Preparation of Polyurethane Composition with Diluent

The polyurethane polymer is obtained by following the process as described in example 1.

The amount (in wt.-%) of compounds used for the preparation of the polyurethane polymer have been provided in table 6.

TABLE 6

| S. No. | Compound | Amount (wt.-%) |
|---|---|---|
| 1. | PEG | 91.5 |
| 2. | Isocyanate (H12 MDI) | 5.2 |
| 3. | Alcohol (Hexanol) | 3.2 |
| 4. | Catalyst | 0.08 |
| 5. | Solubilizer | 0 |

The polyurethane polymer obtained is taken for analysis and measurement of viscosity. The viscosity of polyurethane is found to be 200 Pa·s at a temperature of 100° C.

Thereafter, water is added to the polyurethane obtained and a polyurethane composition having a viscosity of 2.020 Pa·s determined according to DIN EN ISO 3219 at a temperature of 23±0.2° C. and a shear rate of 1 $s^{-1}$ is obtained.

The polyurethane composition comprises total polymer (25.0 wt.-%), diluent (20.0 wt.-%) and water (55.0 wt.-%).

Table 7 provides the mass flow for the compounds used for the process of the present invention.

TABLE 7

| Example 2 | | | |
|---|---|---|---|
| Continuous drying | Residual H₂O content of PEG8000 (in ppm) | | 43 |
| Step A | Mass flow (in g/h) | PEG8000 | 800 |
| | | H12MDI | 45.1 |
| | | Decanol | 28.3 |
| | | DBU | 0.7 |
| | Temperature (in ° C.) | R'1 | 75 |
| | | R'2 | 75 |
| Step B | Temperature (in ° C.) | R1 | 90 |
| | | R2 | 90 |
| | | R3 | 110 |
| | | R4 | 110 |
| | | R5 | 110 |
| | Pressure (in bar) | Before R'1 | 11.2 |
| | | After R5 | 2.9 |
| Step C | Mass flow (in g/h) | Butyldiglycol | 700 |
| | | Water | 1920 |
| | Viscosity of PU composition at 23° C. according to DIN EN ISO 3219 (in Pa · s) | | 1.173 |

Comparative Example 2

Process for Manufacturing of Polyurethane with Diluent in a Solvent Batch Process Pluriol® E 8000 E (Polyethylene Glycol 8000, 200 g, 22 mmol) was dissolved in toluene (420 g) and dried via azeotropic distillation at 110° C. until water content <200 ppm as confirmed by Karl Fischer Titration. The mixture was cooled to 90° C. und under dry nitrogen atmosphere n-decanol (6.98 g, 44 mmol), BiCat8108M (0.1 g) and Desmodur© W (H12MDI, 11.32 g, 44 mmol) were added. The mixture was stirred until residual NCO content <0.01, then cooled to 80° C. and 50 g water and 161.8 g butyl-diglycol were added. Upon heating to 90° C. the azeotropic distillation starts. Water (447 g) is continuously added while toluene is removed until residual toluene content is below 100 ppm. Finally, solids are adjusted to 20 wt.-% by adding the remaining portion of water.

Preparation of Paint Formulation Based on Acronal® DS6277

In a representative example, first a masterbatch is prepared by mixing the compounds provided in table 8 in the given order using a dissolver and intense stirring. Kronos® 2190 is added stepwise followed by intense stirring for 10 minutes (2000 rpm to 3000 rpm).

TABLE 8

| Order of addition | Compound | Ratio |
|---|---|---|
| 1 | Water | 200 |
| 2 | Ammonia | 1 |
| 3 | Hydropalat ® WE3240 | 1 |
| 4 | FoamStar ® Si2210 | 3 |
| 5 | Dispex ® CX 4320 | 6 |
| 6 | Solvenon ® DPM | 20 |
| 7 | Kronos ® 2190 | 220 |
| 8 | Finntalc ® M15 | 50 |
| 9 | Acronal ® DS6277 | 475 |
| 10 | FoamStar ® SI 2210 | 4 |

The master batch is split into several samples and the polyurethane composition according to the present invention (additive/thickener) is incorporated into it as provided in table 9, for 10 minutes at 2000 rpm to 3000 rpm using a dissolver, to obtain the paint formulation.

TABLE 9

| Compound | Ratio |
|---|---|
| Master batch based on Acronal ® DS6277 | 99.6 |
| Additive/thickener | 0.4 |

Viscosities for paint formulations comprising the polyurethane composition prepared by a solvent batch process of the prior art (comparative example 2) and polyurethane composition (additive/thickener) obtained by the continuous process of the present invention are calculated at different shear rates and results are provided in table 10.

TABLE 10

| Example No. | Viscosity (in Pa·s) at a shear rate of 1 s$^{-1}$ | Viscosity (in Pa·s) at a shear rate of 10 s$^{-1}$ | Viscosity (in Pa·s) at a shear rate of 100 s$^{-1}$ | Viscosity (in Pa·s) at a shear rate of 1000 s$^{-1}$ | Viscosity (in Pa·s) at a shear rate of 10000 s$^{-1}$ |
|---|---|---|---|---|---|
| Comparative example 2 (solvent batch process) | 10.840 | 6.768 | 1.933 | 0.242 | 0.035 |
| Example 2 (continuous solvent free process of the present invention) | 10.870 | 6.679 | 1.945 | 0.256 | 0.037 |

The results provided in table 10 clearly demonstrate that the paint formulation prepared by incorporating the polyurethane composition (additive/thickener) obtained by the process of the present invention exhibits a non-Newtonian rheology profile, i.e. the viscosity decreases with increase in the shear rate. Further, the viscosities of the paint formulation comprising the polyurethane composition (additive/thickener) at different shear rates are found comparable to the paint formulation which comprises the polyurethane composition prepared according to a solvent batch process. Thus, the process of the present invention provides a polyurethane composition (additive/thickener) which not only offers a non-Newtonian rheology profile upon addition to paint formulation but is also able to overcome the disadvantages associated with the use of a solvent batch process such as difficulties in regulating the process and quality of product, high VOC etc.

The invention claimed is:

1. A continuous process for preparing a polyurethane composition comprising the steps of:
   (A) mixing
      (a) at least one polyalkylene glycol having a water content in the range of ≥0.0 to ≤0.1 wt.-% by weight of the polyalkylene glycol,
      (b) at least one compound selected from the group consisting of C$_4$ to C$_{30}$ alcohols, C$_4$ to C$_{30}$ alcohol alkoxylates and C$_4$ to C$_{30}$ alkyl phenol alkoxylates,
      (c) at least one polyisocyanate, and
      (d) at least one catalyst,
      at a temperature in the range of ≥50° C. to ≤80° C. to obtain a reaction feed stream,
   (B) subjecting the reaction feed stream of step (A) in at least one reactor to a temperature in the range of ≥80° C. to ≤150° C. and a residence time in the range of 0.05 h to ≤4 h to obtain a polyurethane;
      wherein the viscosity of the polyurethane obtained in step (B) is in the range of ≥1 Pa·s to ≤5000 Pa·s at a temperature of 100° C.; and
   (C) adding water to the polyurethane of step (B) to obtain a polyurethane composition, characterized in that the difference between the temperature in step (B) and the temperature in step (A) is in the range of ≥10° C. to ≤50° C.;
      wherein, step (A) and step (B), independent of each other, is carried out in the static mixer.

2. The process according to claim 1, characterized in that the at least one polyalkylene glycol (a) is a polyethylene glycol having a weight average molecular weight M$_w$ in the range of ≥7,500 g/mol to ≤9,500 g/mol determined according to DIN 55672-1.

3. The process according to claim 1, characterized in that the at least one compound (b) is selected from C$_6$ to C$_{14}$ aliphatic alcohols.

4. The process according to claim 1, characterized in that the at least one polyisocyanate (c) is selected from the group consisting of aliphatic polyisocyanate (c1) and aromatic polyisocyanate (c2).

5. The process according to claim 1, characterized in that the at least one polyisocyanate (c) is an aliphatic polyisocyanate (c1).

6. The process according to claim 5, characterized in that the aliphatic polyisocyanate (c1) is 4,4'-diisocyanatodicyclohexylmethane and/or isophorone diisocyanate.

7. The process according to claim 1, characterized in that the at least one catalyst (d) is selected from the group consisting of metallic catalyst (d1) and non-metallic catalyst (d2).

8. The process according to claim 1, characterized in that in step (C) at least one diluent (e) is added.

9. The process according to claim 8, characterized in that the at least one diluent (e) is selected from the group consisting of alkali metal soaps of higher fatty acids, alkylaryl sulfonates such as sodium dodecyl benzene sulfonate, long chain fatty alcohol sulfates, olefin sulfates and olefin sulfonates, sulfated monoglycerides, sulfated esters, sulfonated ethoxylated alcohols, sulfosuccinates, alkane sulfonates, phosphate esters, alkyl isethionates, alkyl taurates, and alkyl sarcosinates, alkoxylated alcohols, and butyldiglycol.

10. The process according to claim 1, characterized in that in at least one of step (A) and/or step (B) and/or step (C), independent of one another, at least one solubilizer (f) is added.

11. The process according to claim 10, characterized in that the at least one solubilizer (f) is selected from the group consisting of dimethylsulfoxide, sulfolan, N-methylpyrrolidone, (poly)alkyleneglycol dialkyl ethers, (poly)alkylene glycol monoalkyl ether, toluene, acetonitrile, tetrahydrofuran, butyltriglycol, propyleneglycol and mixtures thereof.

12. The process according to claim 1, characterized in that the static mixer is having a plurality of webs disposed on the inner surface of the static mixer.

13. The process according to claim 1, characterized in that in step (C) the water is pre-heated and added to the polyurethane of step (B) in static mixer having a plurality of webs disposed on the inner surface of the static mixer.

14. The process according to claim 13, characterized in that in step (C) the water is pre-heated at temperature in the range of ≥50° C. to ≤140° C.

15. The process according to claim 1, further comprising the step of:
(D) cooling the polyurethane composition obtained in step (C) at a temperature in the range of ≥30° C. to ≤70° C.

16. A polyurethane composition obtained by the process according to claim 1.

17. A rheology modifier comprising the polyurethane composition according to claim 16.

18. A formulation comprising:
(a) ≥0.01 wt.-% to ≤10 wt.-% of the polyurethane composition according to claim 16, and
(b) ≥15 wt.-% to ≤99 wt.-% of at least one of the components, selected from the group consisting of pigments, fillers, binders, defoamers, neutralising agent, wetting agent, pigment dispersing agents, and water.

19. The process according to claim 1, characterized in that the viscosity of the polyurethane composition obtained in step (C) is in the range of ≥0.5 Pa·s to ≤100 Pa·s at a temperature of 23° C.

* * * * *